(12) United States Patent
Sugimura et al.

(10) Patent No.: US 12,056,555 B2
(45) Date of Patent: Aug. 6, 2024

(54) COIL FOR RFID TAG

(71) Applicant: PHOENIX SOLUTION CO., LTD., Ishikawa (JP)

(72) Inventors: Shiro Sugimura, Ishikawa (JP); Takahiro Ishibashi, Toyama (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 0 days.

(21) Appl. No.: 18/006,899

(22) PCT Filed: Aug. 17, 2021

(86) PCT No.: PCT/JP2021/030037
§ 371 (c)(1),
(2) Date: Jan. 26, 2023

(87) PCT Pub. No.: WO2022/039159
PCT Pub. Date: Feb. 24, 2022

(65) Prior Publication Data
US 2023/0274122 A1    Aug. 31, 2023

(30) Foreign Application Priority Data

Aug. 19, 2020 (JP) ................................ 2020-138489

(51) Int. Cl.
*G06K 19/077*    (2006.01)
(52) U.S. Cl.
CPC .............................. *G06K 19/07773* (2013.01)
(58) Field of Classification Search
CPC ............................................... G06K 19/07773
(Continued)

(56) References Cited

U.S. PATENT DOCUMENTS

2008/0245851 A1* 10/2008 Kowalski ........... G06K 7/10178
235/375
2011/0063184 A1*  3/2011 Furumura ......... G06K 19/07783
343/856
(Continued)

FOREIGN PATENT DOCUMENTS

JP    2007-083574 A    4/2007
JP    2008-167190 A    7/2008
(Continued)

OTHER PUBLICATIONS

International Search Report issued in Patent Application No. PCT/JP2021/030037 dated Oct. 19, 2021.

*Primary Examiner* — Paultep Savusdiphol
(74) *Attorney, Agent, or Firm* — PEARNE & GORDON LLP

(57) ABSTRACT

To provide a coil that has satisfactory characteristics even when the coil is used by being attached to or embedded in a tire, the coil forming an RFID tag in combination with a substrate on which an RF chip and a pattern coil connected to the RF chip are mounted. A coil 30 is held in a housing 75 accommodating a substrate 90 and is wound around the substrate 90. A first end of the coil 30 extends from the substrate 90 and forms a first element 50 of an antenna. A second end of the coil 30 extends from the substrate 90 and forms a second element 60 of the antenna. The first element 50 and the second element 60 are arranged in parallel to each other, and the first element 50 has a longer extension length than the second element 60. The coil 30 and a pattern coil 40 form a coupling transformer 20. The number of windings in the coil 30 is smaller than the number of windings in the pattern coil 40.

7 Claims, 10 Drawing Sheets

(58) Field of Classification Search
USPC .......................................................... 235/492
See application file for complete search history.

(56) References Cited

U.S. PATENT DOCUMENTS

| 2013/0075477 | A1* | 3/2013 | Finn ..................... H01Q 1/2225 |
| | | | 29/601 |
| 2018/0114042 | A1* | 4/2018 | Tenno ................. G06K 7/10336 |
| 2018/0241126 | A1* | 8/2018 | Nomura ................... H01Q 7/06 |

FOREIGN PATENT DOCUMENTS

| JP | 2011-097586 A | 5/2011 |
| JP | 2017-132291 A | 8/2017 |
| WO | 2008/122869 A2 | 10/2008 |
| WO | 2017/022511 A1 | 2/2017 |
| WO | 2017/082017 A1 | 5/2017 |

* cited by examiner (a)

(b)

COIL FOR RFID TAG

TECHNICAL FIELD

The present invention relates to a coil for RFID tag.

BACKGROUND ART

Patent Literature 1 (Domestic Re-publication of PCT International Application No. 2007-083574) discloses a wireless IC device including a wireless IC chip, a power feeding circuit board connected to the wireless IC chip and provided with a power feeding circuit including a resonance circuit having a predetermined resonance frequency, and a radiation plate to which the power feeding circuit board is affixed or in proximity of which the power feeding circuit board is arranged and that radiates a transmission signal fed from the power feeding circuit and/or receives a receiving signal and feeds the receiving signal to the power feeding circuit, wherein a frequency of the transmission signal and/or a frequency of the receiving signal substantially correspond/corresponds to the resonance frequency of the resonance circuit.

Patent Literature 2 (Japanese Patent Laid-Open No. 2011-097586) describes an assembly of a main body of an article and an electronic tag, in which the electronic tag is a tag of a type having an electronic device storing specific data of the article and an antenna, coupled to the electronic device, for transmitting the stored data to a remote reader device, a certain portion of the article is at least partially composed of a material composition containing rubber, the electronic device and the antenna are attached to the certain portion of the article and each have external contact means, the antenna is flexible and is at least partially composed of a flexible conductive material, and the flexible conductive material at least partially contains conductive rubber.

Patent Literature 3 (Japanese Patent Laid-Open No. 2017-132291) discloses an RFID tag-incorporated tire including an RFID chip and an antenna, in which the antenna includes a first antenna to be connected to the RFID chip and a second antenna provided outside the first antenna and to be electromagnetically coupled to the first antenna, the RFID chip and the first antenna are fixed to a first fixing member, an RFID tag is arranged outside in a tire radial direction of a carcass ply end of a tire, and the second antenna is electromagnetically coupled to a carcass ply cord having a conductive property constituting a carcass ply.

CITATION LIST

Patent Literature

Patent Literature 1: Domestic Re-publication of PCT International Application No. 2007-083574
Patent Literature 2: Japanese Patent Laid-Open No. 2011-097586
Patent Literature 3: Japanese Patent Laid-Open No. 2017-132291

SUMMARY OF INVENTION

Technical Problem

As an information recording and reproduction apparatus of a non-contact type capable of writing or reading out information using a radio wave, there is a passive radio frequency identification transponder (hereinafter referred to as an RFID tag). A tire can be managed by attaching the transponder to the tire and writing or reading out information about the tire into and from the transponder.

In a tire for a vehicle such as an automobile, for example, it is necessary to grasp, in manufacture management, distribution management, maintenance management during use of the tire, and further manufacture management of a retread tire a worn tread portion of which is repaired after completion of a primary life, and maintenance management thereof, for example, specific information of the tire such as its specification, manufacturing history, and use history.

Distortion in a tire that occurs when a vehicle is traveling is concentrated on a boundary surface between coating rubber for coating an electronic component such as an RFID tag and an adjacent member. As a result, a crack may occur between the electronic component and the adjacent member, thereby creating a problem.

On the other hand, when the coating rubber for coating the electronic component is blended with a large amount of carbon black from the viewpoint of an improvement in durability, an influence occurs in a communication performance of the RFID tag attached to the tire so that satisfactory communication may be impossible.

Conventionally, almost all of RFID tags to be used while being embedded in rubber products such automotive tires are each an RFID tag using a half-wavelength dipole antenna system. However, when the RFID tag using the dipole antenna system is embedded in the rubber product containing the carbon black, a resistor having a resistance of several ten kilo-ohms to several 100 kilo-ohms is connected between two power feeding points of the RFID tag. The resistor exists between two antenna elements of the half-wavelength dipole antenna, thereby greatly affecting an impedance and an effective electrical length of an antenna.

In a normal dipole antenna, an RF chip is arranged at the center of the dipole antenna. Accordingly, there is also a problem that when a tire greatly expands and contracts, respective bonding portions between the RF chip and two antenna wires to be connected to both ends of the RF chip are broken so that communication cannot be performed.

When an RFID tag including a dipole antenna is directly embedded in a tire, there is a problem that a shape and an electrical length of the dipole antenna change in a process for manufacturing the tire at the time of vulcanization, for example so that a characteristic such as a communicable distance at a communication frequency of the RFID tag deteriorates.

The wireless IC device according to the invention described in Patent Literature 1 is configured such that the power feeding circuit including the resonance circuit having the predetermined resonance frequency is arranged between the wireless IC chip and the radiation plate and the frequency of the transmission signal and/or the frequency of the receiving signal substantially correspond/corresponds to the resonance frequency of the resonance circuit.

However, the radiation plate is electromagnetically coupled and/or capacitively coupled to the power feeding circuit (see a first embodiment and FIGS. 1 to 7). Accordingly, a signal source impedance of the radiation plate is high. Therefore, there has been a problem that when the wireless IC device is embedded in a rubber product containing carbon black, a characteristic such as a communicable distance of the wireless IC device is easily affected by an impedance of the carbon black and a relative permittivity of the rubber product.

The assembly of the main body of the article such as tire rubber and the electronic tag in the invention described in Patent Literature 2 is suitable for mechanical incorporation into the article by using the flexible conductive material at least partially containing the conductive rubber for the antenna.

However, there have been problems that when the electronic tag is embedded in a rubber product containing carbon black, a characteristic such as a communicable distance of a wireless IC device is easily affected by an impedance of the carbon black and a relative permittivity of the rubber product and that when the antenna is composed of conductive rubber, a resistance component thereof is larger than that of an antenna made of a metal.

The RFID tag-incorporated tire in the invention described in Patent Literature 3 is an RFID tag-incorporated tire in which the first antenna to be connected to the RFID chip and the second antenna provided outside the first antenna are electromagnetically coupled to each other and the second antenna is electromagnetically coupled to the carcass ply cord having a conductive property.

However, the first antenna and the second antenna are electromagnetically coupled to each other, and a signal source impedance of the second antenna is high. Therefore, there has been a problem that when the RFID tag is embedded in a rubber product containing carbon black, a characteristic such as a communicable distance of the RFID tag is easily affected by an impedance of the carbon black and a relative permittivity of the rubber product.

A main object of the present invention is to provide a coil for RF tag that is hardly affected by carbon black contained in a tire and a relative permittivity of the tire even when used while being affixed to or embedded in the tire and can constitute an RFID tag excellent in communication characteristic.

Solution to Problem (1)

A coil for RFID tag according to one aspect is used in an RFID tag including an RF chip and a substrate having a pattern coil connected to the RF chip mounted thereon. The RF chip and the pattern coil may be mounted to be arranged on a surface of the substrate, or may be mounted to be embedded in the substrate.

The substrate and the coil are housed in a housing, the coil is wound around the substrate, a first end portion of the coil extends from the substrate to constitute a first element of an antenna, a second end portion of the coil extends from the substrate to constitute a second element of the antenna, the first element and the second element are parallel to each other and the first element has a larger extension length than that of the second element, and the coil and the pattern coil constitute a coupling transformer and a number of windings of the coil is smaller than a number of windings of the pattern coil.

In this case, when the number of windings of the coil corresponding to a primary side of the coupling transformer is made smaller than the number of windings of the pattern coil corresponding to a secondary side thereof, an input impedance of the coil to which the first element and the second element are connected is set to a low impedance, and the secondary side can be converted into a high impedance and adapted to an input impedance of the RF chip.

A positional relationship between the substrate and the coil can be stabilized by a guide section provided in the housing.

When the coil constituting the RFID tag according to the present invention is attached to a rubber product such as a tire, the second element is electrically connected to the rubber product such as the tire having a resistive impedance. Accordingly, the rubber product such as the tire functions as a ground of the RFID tag, whereby communication can be performed with high sensitivity. Therefore, the RFID tag can be one excellent in communication characteristic when attached to the rubber product such as the tire.

In the RFID tag constituted by the coil according to the present invention, the primary side of the coupling transformer need not be arranged on an upper surface of the substrate. Accordingly, the size of the substrate can be efficiently reduced. As a result, the RFID tag can be one that is not easily broken or peeled and is excellent in durability even when attached to a rubber product such as a tire accompanied by deformation.

The coil according to the present invention may be an air core coil.

(2)

A coil according to a second invention is the coil according to the one aspect, in which the coil and the first element and the second element in the respective end portions of the coil may be formed by bending one conducting wire.

In this case, connection between the coil and the first element and the second element need not be performed by soldering or the like. Accordingly, a manufacturing process is simple, and the reliability of electrical connection is high.

(3)

A coil according to a third invention is the coil according to the one aspect or the second invention, in which the housing may include a guide section that holds a shape of the coil and a storage section that stores the substrate, and an axis of the pattern coil and an axis of the coil may match each other.

In this case, the coil and the substrate are fixed to the housing. Accordingly, a center axis of the pattern coil and a center axis of the coil can be made to accurately match each other. Therefore, the efficiency of the coupling transformer can be increased.

(4)

A coil according to a fourth invention is the coil according to the one aspect to the third invention, in which letting $\lambda$ be a wavelength of a radio wave at a communication frequency of the RFID tag, an electrical length of the first element may be $\lambda/4$, $\lambda/2$, $(3/4)\lambda$, or $(5/8)\lambda$.

In this case, when the electrical length of the first element is set to $\lambda/4$, $\lambda/2$, $(3/4)\lambda$, and $(5/8)\lambda$, a resonance frequency of the first element can be made to match the communication frequency of the RFID tag, and a communication distance of the RFID tag can be increased.

(5)

A coil according to a fifth invention is the coil according to the one aspect to the fourth invention, in which the coil and the substrate may be molded into the housing with resin.

In this case, the primary side of the coupling transformer and the substrate can be prevented from shifting in position at the time of embedding, for example. The RF chip can be molded with the resin. Accordingly, the RF chip can be mounted on the pattern coil in a bare chip state where it has not been packaged.

(A)

A coil according to an invention A is the coil according to the second invention, in which the one conducting wire may be a braided wire of a conductor.

In this case, when the first element and the second element are each formed of the braided wire of the conductor (a braided copper wire, a braided conducting wire), even if the tire is greatly deformed, all braided wires are not broken at a time. Accordingly, communication can be maintained, and the RFID tag is excellent in durability.

(B)

A coil according to an invention B is the coil according to the one aspect to the fifth invention, in which the coil may be affixed to the inside of the tire or may be embedded in rubber of the tire.

In this case, various types of data for maintaining and managing the tire can be managed by the RFID tag affixed to the inside of the tire or embedded in the rubber of the tire.

(C)

In an RFID tag-incorporated tire according to an invention C, the RFID tag including the coil according to the one aspect to the fifth invention may be affixed to the inside of the tire or may be embedded in the rubber of the tire.

In this case, communication with the RFID tag affixed to the inside of the tire or embedded in the rubber of the tire makes it possible to write or read out specific information of the tire such as a specification, a manufacturing history, and a use history for maintaining and managing the tire.

BRIEF DESCRIPTION OF DRAWINGS

FIG. 21(b) is a schematic top view of the RFID tag including the coil according to the second modification.

DESCRIPTION OF EMBODIMENTS

Figure 1:
FIG. 1 is a schematic front view of an RFID tag viewed from the side of a first surface of a substrate.

Embodiments of the present invention will be described below with reference to the drawings. In the following description, the same components are respectively assigned the same reference numerals. The components are respectively the same in names and functions if assigned the same reference numerals. Therefore, detailed description thereof is not repeated.

The claimed invention recited in the claims corresponds to a coil according to a third embodiment, described below.

First Embodiment

Figure 2:
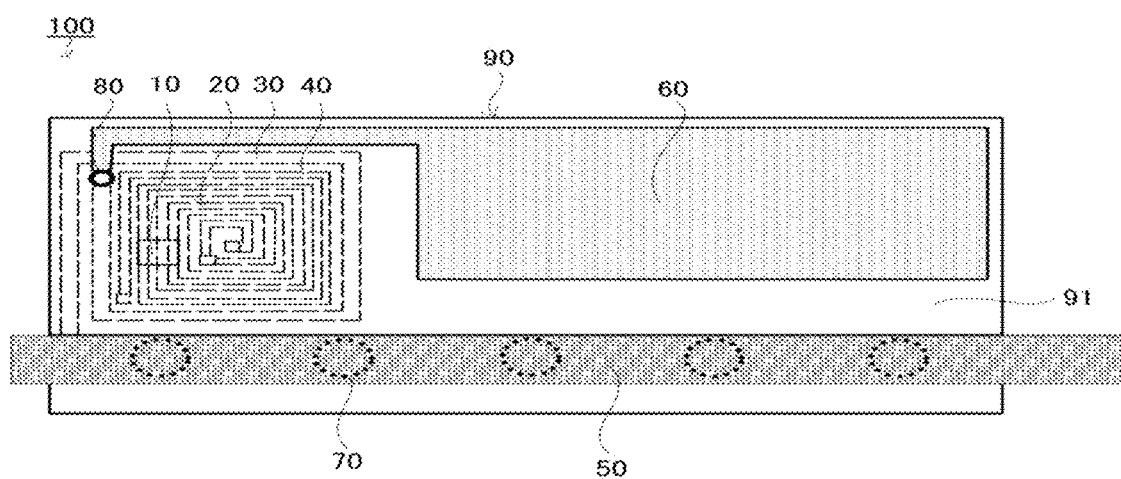
FIG. 2 is a schematic enlarged front view viewed from the side of the first surface of the substrate.
Figure 3:
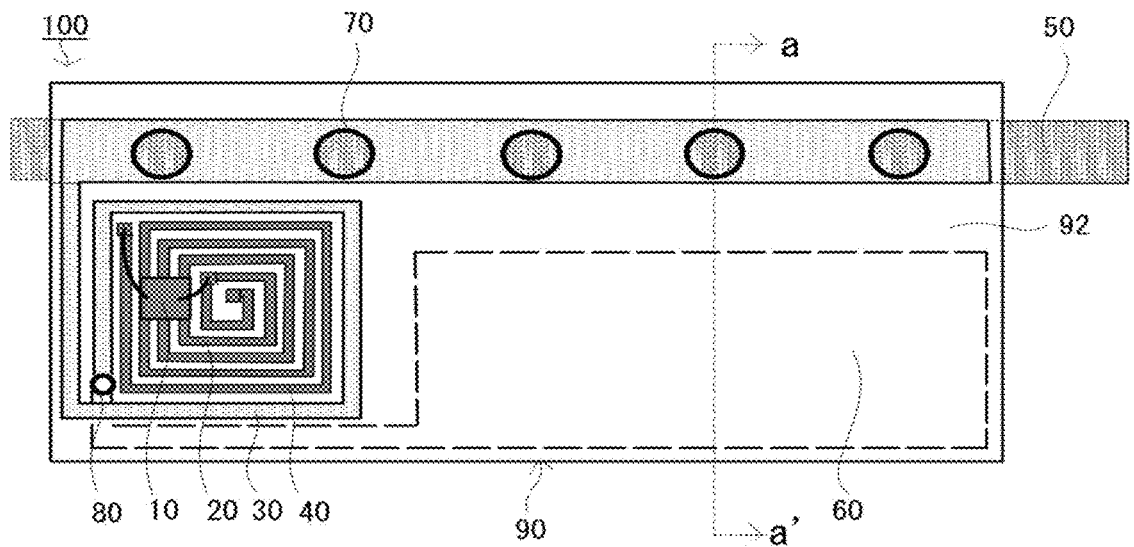
FIG. 3 is a schematic enlarged rear view viewed from the side of a second surface of the substrate.
Figure 4:
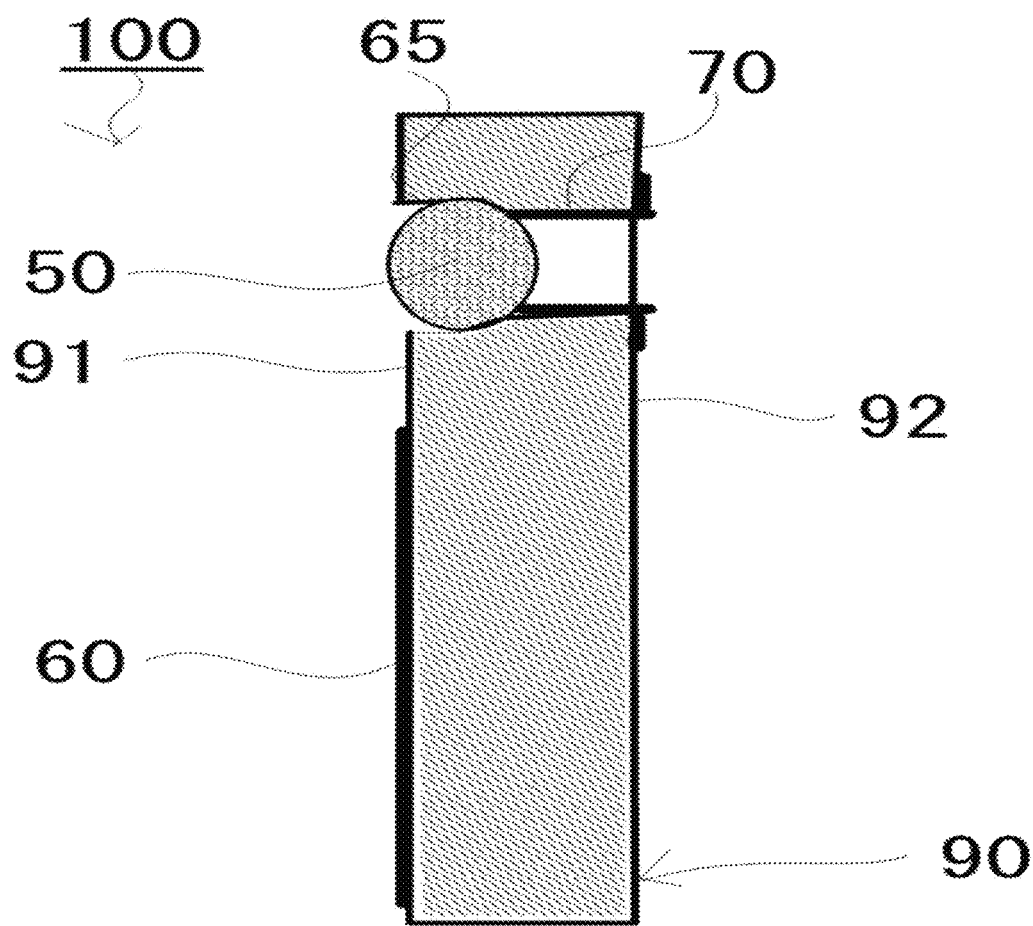
FIG. 4 is a schematic sectional view of the substrate taken along a line a-a' illustrated in FIG. 3.
Figure 5:
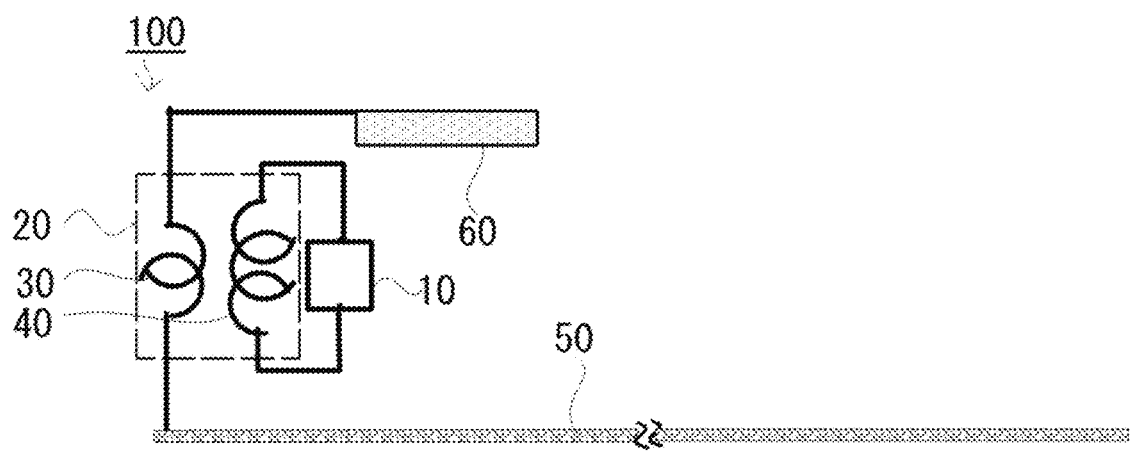
FIG. 5 is an equivalent circuit diagram of the RFID tag.

FIG. 1 is a schematic front view of an RFID tag 100 viewed from the side of a first surface 91 of a substrate 90, illustrating the RFID tag 100 including a first element 50, a second element 60, and a substrate 90 that constitute an antenna. FIG. 2 is a schematic enlarged front view viewed from the side of the first surface 91 of the substrate 90, FIG. 3 is a schematic enlarged rear view viewed from the side of a second surface 92 of the substrate 90, and FIG. 4 is a schematic sectional view of the substrate 90 taken along a line a-a' illustrated in FIG. 3. FIG. 5 is an equivalent circuit diagram of the RFID tag 100.

As illustrated in FIGS. 1 to 4, a rail-shaped groove 65 (see FIG. 4) is formed on the first surface 91 of the substrate 90 formed in a rectangular parallelepiped shape, and the second element 60 formed of a conductor having a rectangular shape is provided on the first surface 91 of the substrate 90. A plurality of through holes 70 are provided in a bottom portion of the groove 65. The plurality of through holes 70 can be provided with an appropriate spacing. Although the five through holes 70 are provided in the present embodiment, the number of through holes 70 is preferably two or more, and more preferably four or more. The first element 50 formed of a braided wire of the conductor is disposed in the groove 65.

Here, "the first element 50 is disposed in the groove 65" means that the first element 50 and the through holes 70 are electrically connected to each other, regardless of its form. For example, the first element 50 having deformability may be press-fitted into the groove 65. The first element 50 is arranged in the groove 65 and a part of a butyl rubber sheet 120 enters the groove 65 so that the first element 50 and the through holes 70 may be electrically connected to each other or may remain capacitively coupled to each other.

The first element 50 is disposed in the groove 65, to enter a state where one end portion and the other end portion of the first element 50 are extended outward from the substrate 90. In the present embodiment, an extension length of the one end portion is approximately one-tenth of the entire length of the first element 50, and an extension length of the other end portion is approximately four-fifths of the entire length of the first element 50. An extension direction of the other end portion of the first element 50 is substantially along a longitudinal direction of the substrate 90.

(First Element 50)

As a braided wire used for the first element 50, a wire (including a mesh wire) configured by braiding any metal wire such as a copper wire, an iron wire, or a brass wire can be used. Another metal material (e.g., in a tape shape or a ribbon shape) having flexibility and conductivity can also be used.

The braided wire is composed of a set of a plurality of metal wires. Accordingly, a component of the butyl rubber sheet 120 (see FIG. 9) penetrates into the braided wire, and the braided wire is integrated with the butyl rubber sheet 120, thereby making it possible to reliably prevent the RFID tag 100 from being peeled from the butyl rubber sheet 120 and a tire 160 (see FIG. 11).

Further, the first element 50 can be bent, twisted, and deformed, for example, when formed of the braided wire. Therefore, when the tire 160 is deformed or vibrated, the first element 50 follows the deformation and the vibration of the tire 160, thereby preventing the first element 50 from being broken and preventing a portion connected to the substrate 90 from being peeled.

The second element 60 can be formed of a metal pattern, a metal foil, a metal plate, or the like. A surface of the second element 60 is exposed to a surface of the substrate 90 to reduce an impedance between itself and the tire 160. Although the size of the second element 60 is not limited, the second element 60 has a shape of a rectangle having dimensions of approximately 5.5 mm×2.5 mm in the present embodiment. The shape of the second element 60 need not necessarily be a rectangle, but may be a circle, for example. To reduce a connection impedance between the second element 60 and the tire 160, the area of the second element 60 is preferably 3 mm² or more, and more preferably 5 mm² or more.

Then, an RF chip 10 and a coupling transformer 20 are provided on the second surface 92 of the substrate 90. Two terminals of a primary side 30 of the coupling transformer 20 are respectively connected to the first element 50 and the second element 60 via the through holes 70 provided in the bottom portion of the groove 65 and a through hole 80 provided in the substrate 90. Two terminals of a secondary side 40 of the coupling transformer 20 are respectively connected to terminals of the RF chip 10 by wire bonding.

Although a case where both the primary side 30 and the secondary side 40 of the coupling transformer 20 are provided on the second surface 92 of the substrate 90 will be described in the present embodiment, the present invention is not limited to this. The primary side 30 and the secondary side 40 may be respectively provided on different surfaces of the substrate 90 to constitute the coupling transformer 20, or may be respectively provided, by forming the substrate 90 as a laminate of a plurality of layers, on the different layers.

The RF chip 10 is bonded to a surface of the secondary side 40 of the coupling transformer 20 or the substrate 90 with an adhesive such as an epoxy-based die bond material or the like. The secondary side 40 of the coupling transformer 20 and the RF chip 10 are sealed with a resin layer.

As the resin layer, insulating resin such as epoxy resin, acrylic-based resin (resin using acrylic resin and a derivative as main components), and urethane resin can be used.

As the RF chip 10, a commercially available product usually used can be used, and in particular an RF chip having resistance to a vulcanization temperature of approximately 120° C. is preferably used.

Figure 9:
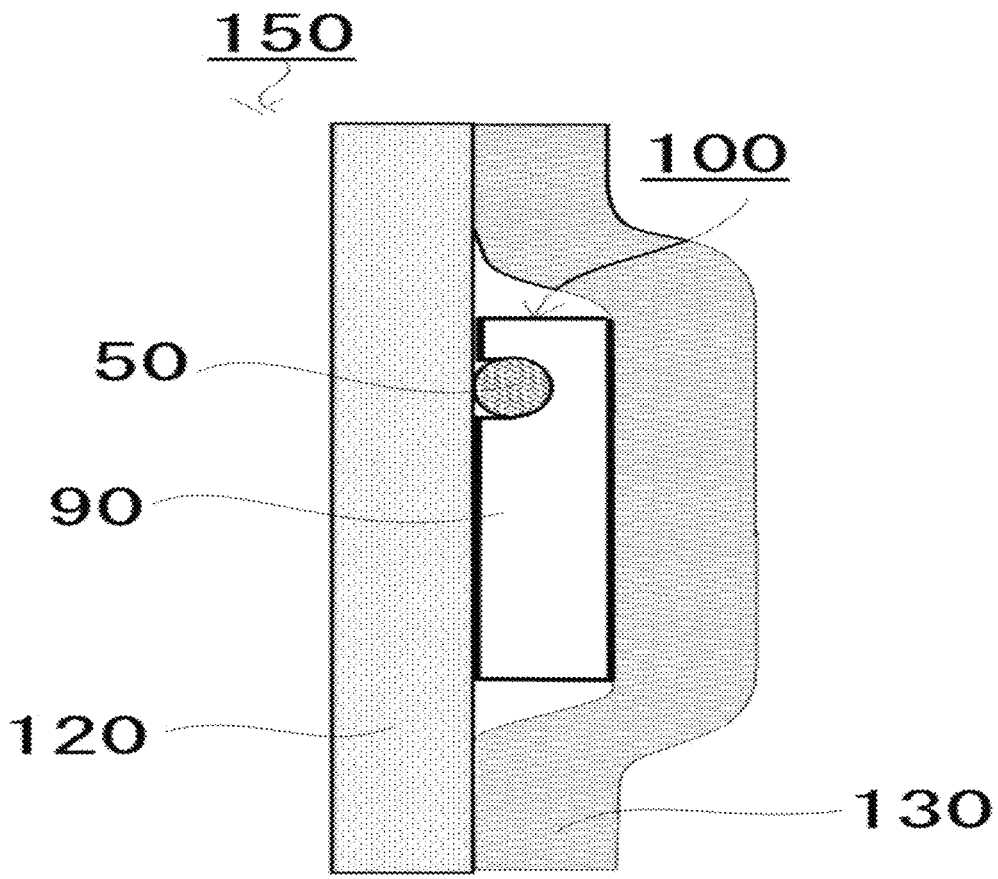
FIG. 9 is a schematic sectional view illustrating a rubber-coated RFID tag in a state where the RFID tag is sandwiched between the butyl rubber sheet and a second rubber sheet as viewed from the side.

The RFID tag 100 according to the present embodiment is usually used by being affixed to or embedded in the tire 160 with the RFID tag 100 sandwiched between the first rubber sheet 120 composed of a butyl rubber sheet and a second rubber sheet 130, as illustrated in FIG. 9.

A specific configuration is as follows.

The RFID tag 100 is disposed between the first rubber sheet 120 and the second rubber sheet 130, and a laminate obtained by laminating the first rubber sheet 120, the RFID tag 100, and the second rubber sheet 130 in this order is pressure-bonded to constitute an RFID tag coated with rubber (hereinafter referred to as a rubber-coated RFID tag 150). The RFID tag 100 is sandwiched between the first rubber sheet 120 and the second rubber sheet 130 such that the first element 50 and the first surface 91 of the substrate 90 are arranged on the side of the first rubber sheet 120 and the first element 50 and the second surface 92 of the substrate 90 are arranged on the side of the second rubber sheet 130. The obtained rubber-coated RFID tag 150 has a form in which the first surface 91 of the substrate 90 is coated with the first rubber sheet 120 and the second surface 92 thereof is coated with the second rubber sheet 130.

(First Rubber Sheet 120)

The first rubber sheet 120 used in the present invention is formed by forming a rubber composition containing butyl rubber into a sheet shape. For example, the first rubber sheet 120 having predetermined dimensions is an elongated sheet obtained by rolling the rubber composition using a roll or the like, and can be easily obtained by cutting the sheet to a predetermined shape and dimensions.

The content of the butyl rubber in the first rubber sheet 120 is preferably 50% by weight or more and is more preferably in a range of not less than 70% by weight nor more than 95% by weight to improve adhesion, gas permeability, and the like. The rubber composition can contain halogenated butyl rubber, diene-based rubber, epichlorohydrin rubber, and the like.

Examples of the diene-based rubber include natural rubber (NR), isoprene rubber (IR), styrene-butadiene copolymer rubber (SBR), acrylonitrile-butadiene rubber (NBR), and chloroprene rubber (CR). One of these types of diene-based rubber may be used alone, or two or more types of diene-based rubber may be used in combination.

Blending agents usually used in a rubber industry, e.g., a reinforcing filler, a softener, an age resistor, a scorch retarder, zinc white, a stearic acid can be further appropriately blended into the above-described first rubber sheet 120 depending on the purpose. As the blending agents, commercially available products can be appropriately used. The thickness of the first rubber sheet 120 can be in a range of not less than 5 μm nor more than 500 μm and in particular preferably not less than 10 μm nor more than 200 μm, although arbitrary.

The first rubber sheet 120 is usually an unvulcanized rubber sheet and excellent in adhesion. For example, the first rubber sheet 120 can be used as a member for an inner liner of the pneumatic tire 160, for example.

(Second Rubber Sheet 130)

The second rubber sheet 130 is formed by forming a second rubber composition containing rubber into a sheet shape. For example, the second rubber sheet 130 having predetermined dimensions is an elongated sheet obtained by rolling the second rubber composition using a roll or the like, and can be easily obtained by cutting the sheet to a predetermined shape and dimensions.

As the type of rubber, one type or two or more types of natural rubber conventionally commonly used and/or various types of synthetic rubber can be appropriately selected and used.

Specific examples of the synthetic rubber include nitrile rubber (NBR), butadiene rubber (BR), isoprene rubber (IR), styrene butadiene rubber (SBR), butyl rubber (IIR), halogenated IIR, ethylene propylene diene rubber (EPDM), chloroprene rubber (CR), ethylene propylene rubber, and acrylonitrile-butadiene rubber (NBR).

Although the above-described first rubber composition can be used as the second rubber composition, the second rubber composition preferably contains a crosslinking agent. As such a crosslinking agent, any type of crosslinking agent can be used if the crosslinking agent is usually used for cross-linking a rubber composition. Examples of the cross-linking agent include sulfur, an organic peroxide, and an organic sulfur compound. A blending amount of the cross-linking agent can be usually not less than 0.1 parts by weight nor more than 10 parts by weight and preferably not less than 1 part by weight nor more than 5 parts by weight per 100 parts by weight of a rubber component.

Various types of additives for rubber such as a vulcanization accelerator, a filler, oil, and an age resistor usually used in a rubber industry can be appropriately blended into a rubber composition.

Examples of the age resistor can include a stearic acid, N-cyclohexyl-2-benzothiazolylsulfenamide (CZ), N, N'-dicyclohexyl-2-benzothiazolylsulfenamide (DZ), di-2-benzothiazolyldisulfide (DM). One type of these may be used alone, or two or more types of these may be used in combination. A blending amount of the vulcanization accelerator can be usually not less than 0.1 parts by weight nor more than 10 parts by weight and preferably not less than 1 part by weight nor more than 3 parts by weight per 100 parts by weight of a rubber component.

Examples of the filler can include carbon black, silica, calcium carbonate, calcium sulfate, talc, clay, mica, zinc white, barium sulfate, and titanium oxide. One type of these can be used alone, or two or more types of these can be used in combination. A blending amount of the filler can be usually not less than 10 parts by weight nor more than 200 parts by weight and preferably not less than 30 parts by weight nor more than 150 parts by weight per 100 parts by weight of a rubber component.

Examples of the oil to be used can include oils such as mineral oils such as paraffin-based oil, naphthene-based oil, aromatic-based process oil, ethylene-α-olefin cooligomer, paraffin wax, and liquid paraffin and vegetable oils such as castor oil, cotton seed oil, linseed oil, rapeseed oil, soybean oil, palm oil, coconut oil, and peanut oil. One type of these can be used alone, or two or more types of these can be used in combination. A blending amount of the oil can be usually not less than 0.1 parts by weight nor more than 100 parts by weight and preferably not less than 1 part by weight nor more than 50 parts by weight per 100 parts by weight of a rubber component.

Examples of the age resistor include naphthylamines such as phenyl-α-naphthylamine; diphenylamines such as octyl-diphenylamine; p-phenylenediamines such as N-isopropyl-N'-phenyl-p-phenylenediamine, N-(1, 3-dimethylbutyl)-N'-phenyl-p-phenylenediamine, and N, N'-di-2-naphthyl-p-phenylenediamine; quinolines such as a 2, 2, 4-trimethyl-1, 2-dihydroquinoline polymer; and phenols such as 2, 6-di-t-butyl-4-methylphenol, styrenated phenol, tetrakis-[methylene-3-(3', 5'-di-t-butyl-4'-hydroxyphenyl) propionate] methane. A blending amount of the age resistor can be usually not less than 0.1 parts by weight nor more than 20 parts by weight and preferably not less than 0.5 part by weight nor more than 10 parts by weight per 100 parts by weight of a rubber component.

The additives may be blended with the rubber composition of the first rubber sheet 120.

The thickness of the second rubber sheet 130 can be in a range of not less than 5 μm nor more 500 μm and in particular preferably not less than 10 μm nor more than 200 μm, although arbitrary.

If the second rubber sheet 130 is an unvulcanized rubber sheet containing a vulcanizing agent and to be cured by heating, the second rubber sheet 130 is preferably subjected to heating and vulcanization processing at usually a temperature of 120° C. or more, preferably a temperature of not less than 125° C. nor more than 200° C., and more preferably a temperature of not less than 130° C. nor more than 180° C. to manufacture a vulcanized sheet by heating. The vulcanized sheet is obtained by the heating. The heating/vulcanization processing is usually performed when a tire is vulcanized.

If the second rubber sheet 130 is thus subjected to heating/vulcanization processing when a tire is vulcanized, the heating/vulcanization processing can be performed with the first rubber sheet 120 side of the rubber-coated RFID tag 150 bonded to an inner surface of the tire 160.

(RFID Tag-Incorporated Tire 500)

Figure 11:
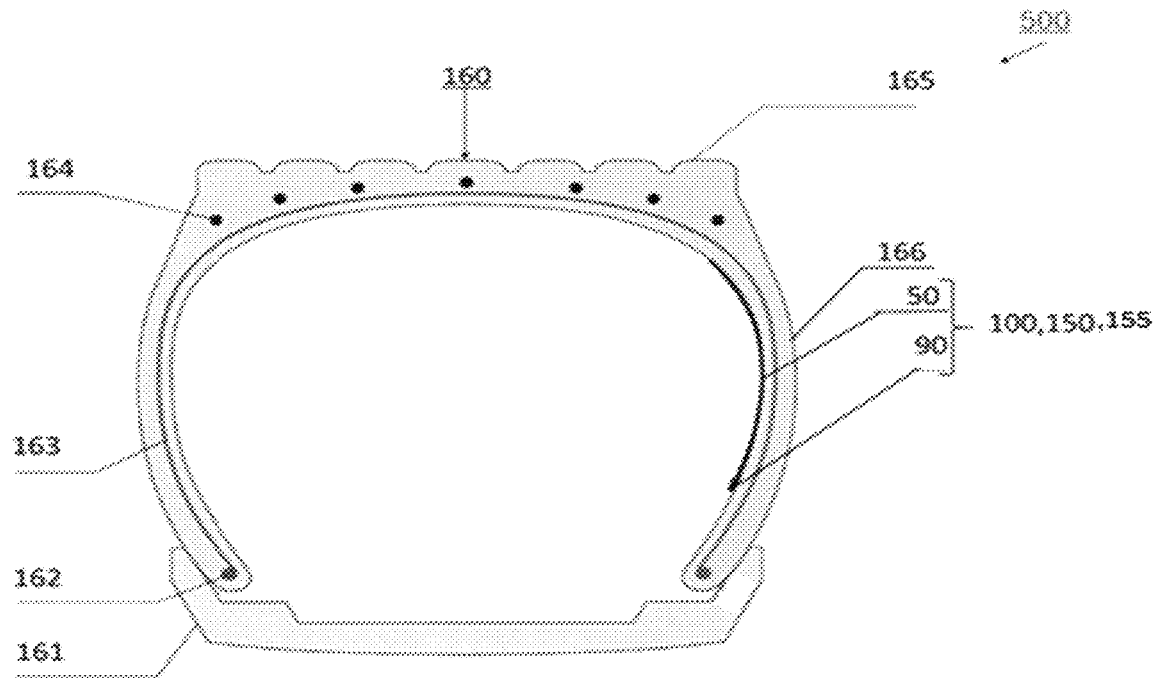
FIG. 11 is a schematic sectional view illustrating a state where the rubber-coated RFID tag is affixed to the inside of the tire.

FIG. 11 is a schematic sectional view illustrating a state where the rubber-coated RFID tag 150 is affixed to the inside of the tire 160, illustrating an RFID tag-incorporated tire 500 in which the rubber-coated RFID tag 150, described below, is attached to the tire 160. The rubber-coated RFID tag 150 may be affixed to the inside of the tire 160 or may be embedded in rubber of the tire 160.

Although the rubber-coated RFID tag 150 is attached to the tire 160 in the present embodiment, the RFID tag 100 may be attached to the tire 160. The tire 160 is typically a tire containing carbon black. The carbon black affects an impedance of the tire.

When the RFID tag 100 or the rubber-coated RFID tag 150 is attached to the tire 160, the second element 60 is electrically connected to the tire 160. As a result, the tire 160 functions as a ground of the RFID tag 100. Therefore, the RFID tag 100 or the rubber-coated RFID tag 150 according to the present invention can also perform communication with high sensitivity when attached to the tire 160. The second element 60 and the tire 160 may be capacitively connected to each other, or may be directly connected to each other.

(Tire 160)

The tire 160 usable in the present invention is not particularly limited, but is usually a pneumatic tire made of rubber and typically a tire 160 containing carbon black. The RFID tag 100 is embedded in or affixed to the side of an inner peripheral surface of the tire 160. A vehicle or the like to which the tire 160 is attached is not particularly limited, but examples thereof include an automobile, a motorcycle, a bicycle, a construction machine, and an airplane.

In FIG. 11, the tire 160 includes a wheel rim 161, a sidewall 166, and a tread 165, and a bead wire 162, a carcass 163, and a breaker cord 164 are embedded therein.

The tire 160 contains a rubber component (natural rubber, synthetic rubber), carbon black, a vulcanizing agent, a filler, and the like. Generally, a blending amount of carbon black is not less than 40 parts by weight nor more than 60 parts by weight and in particular not less than 45 parts by weight nor more than 55 parts by weight per 100 parts by weight of rubber.

The RFID tag 100 is affixed to the inner peripheral surface of the tire 160 using the first rubber sheet 120. The first rubber sheet 120 has adhesion. Even when the first rubber sheet 120 contacts a bleeding component (an oil and fat component, etc.) that bleeds from inside the tire 160, the first rubber sheet 120 is miscible with the bleeding component. As a result, the RFID tag 100 can be affixed to the inner surface of the tire 160 in a long term.

Although the RFID tag 100 may be affixed to an inner peripheral surface of a portion, in which a tread pattern is arranged, of the tire 160, the RFID tag 100 may be affixed to an inner peripheral surface of a bead portion of the tire 160.

Then, an equivalent circuit diagram of the RFID tag 100 illustrated in FIG. 5 will be referred to. At the time of receiving, for example, a radio wave received by the first element 50 and the second element 60 is transmitted to the RF chip 10 via the coupling transformer 20. In this case, an impedance of the RF chip 10 is approximately several kilo-ohms to ten kilo-ohms, while an impedance between the first element 50 and the second element 60 is as small as 100 ohms.

The impedance between the first element 50 and the second element 60 is small due to a large influence of a resistance component of carbon black contained in the second rubber sheet 130 and the tire 160 in the periphery thereof in addition to an impedance of an antenna itself. The vulcanized rubber tire 160 has a resistivity of approximately several ten kilo ohms-cm depending on the type of the tire. On the other hand, the RF chip 10 has an impedance of approximately several kilo-ohms to 10 kilo-ohms.

Therefore, if the RFID tag 100 according to the present embodiment is embedded in the vulcanized rubber tire 160, when a terminal of the RF chip 10 is directly connected to the first element 50 and the second element 60, a received radio wave cannot be efficiently guided to the RF chip 10.

If the RF chip 10 having an input impedance Z and the first element 50 and the second element 60 are connected to each other via the coupling transformer 20 having a winding number ratio n obtained by dividing a number of windings of the secondary-side 40 by a number of windings of the primary side 30, an impedance of the primary side 30 of the coupling transformer 20 is $Z/n^2$.

In the RFID tag 100 according to the first embodiment, the ratio of the number of windings of the secondary side 40 of the coupling transformer 20 and the number of windings of the primary side 30 thereof is adjusted, the primary side 30 of the coupling transformer 20 is matched with a low impedance, and the secondary side 40 is converted into a high impedance and matched to the input impedance of the RF chip 10.

However, an increase in the number of windings of the secondary side 40 is constrained by the area of the coupling transformer 20, for example. The ratio of the respective numbers of windings of the secondary side 40 and the primary side 30 is preferably adjusted by a specification of an IC chip or a material for a tire, the content of carbon black, or the like.

In the present embodiment, the first element 50 extends in one direction from the substrate 90, and the antenna of the RFID tag 100 performs a similar operation to that of a monopole antenna using a second element 60 as a ground plane and a first element 50 as an antenna wire.

Therefore, letting λ be a wavelength at a communication frequency of the RFID tag 100, and letting λ/4 or λ/2 be an electrical length of the first element 50, a resonance frequency of the first element 50 can be preferably made to match the communication frequency of the RFID tag 100.

If the RFID tag 100 is affixed to the vulcanized rubber tire 160 or is embedded therein, the second element 60 is electrically connected to the vulcanized rubber tire 160, whereby the ground plane is further strengthened.

In the present embodiment, the vicinity of the one end portion of the first element 50 formed of the braided wire of the conductor is disposed (e.g., fitted) in the groove 65 formed in the substrate 90, and the other end portion thereof extends from the substrate 90.

In a conventional RFID tag of a dipole antenna type, antenna elements each having an electrical length λ/4 are respectively connected to both ends of a substrate having an RF chip mounted thereon. However, in this configuration, if a tire expands and contracts, and stresses in opposite directions are respectively applied to the two antenna elements, connection between the antenna elements and the substrate may be broken.

On the other hand, if the vicinity of the one end portion of the first element 50 is disposed in the substrate 90, and the other end portion thereof is opened, like in the present embodiment, there is an advantage that connection between the end portion of the first element 50 and the substrate 90 is not easily broken.

Further, in the present embodiment, when the first element 50 formed of the braided wire is disposed while being sandwiched in the groove 65 formed in the substrate 90, and is pressed against the through hole 70 and conductively connected thereto, connection between the first element 50 and the substrate 90 is more resistant to expansion and contraction of the tire 160 and a positional relationship between the first element 50 and the substrate 90 is more stabilized than when soldering is used.

(Manufacture of Rubber-Coated RFID Tag)

Then, an apparatus and a method for manufacturing the rubber-coated RFID tag 150 according to the present invention will be described.

Figure 12:
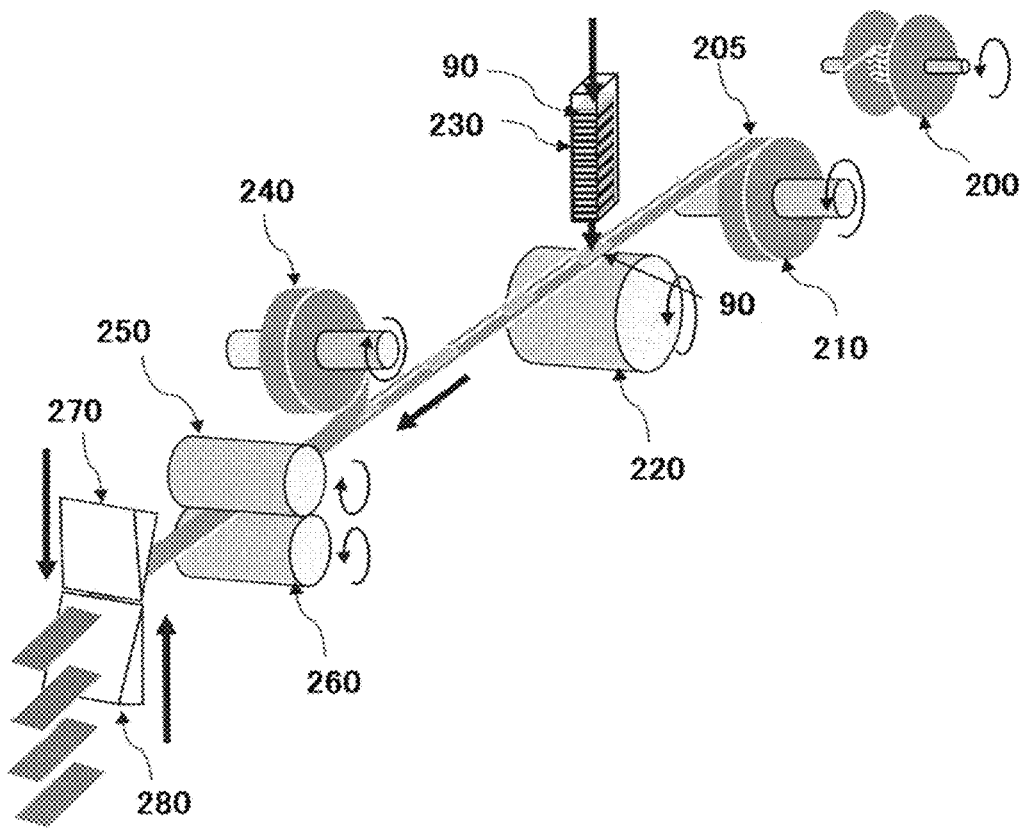
FIG. 12 is a schematic view illustrating an example of a manufacturing line of the rubber-coated RFID tag.

FIG. 12 is a schematic view illustrating an example of a manufacturing line of the rubber-coated RFID tag 150.

In FIG. 12, a braided wire roll 200 is a roll that feeds a braided wire 205 as the first element 50, a butyl rubber roll 210 is a roll that feeds the first rubber sheet 120, and a strip-shaped first rubber sheet 120 is wound therearound. The braided wire 205 is arranged on the first rubber sheet 120 delivered from the butyl rubber roll 210. The braided wire 205 arranged on the first rubber sheet 120 adheres to the first rubber sheet 120.

An idler 220 and a tag stacker 230 are disposed on the feeding side of the butyl rubber roll 210. The tag stacker 230 is configured such that a plurality of substrates 90 are vertically stacked and are sequentially affixed onto the first rubber sheet 120 one at a time. A concave groove 65 formed on the side of a lower surface of one of the substrates 90 is arranged in a feeding direction, and the substrate 90 and the braided wire 205 are positioned such that the braided wire 205 is inserted into the concave groove 65.

In the present embodiment, used as the substrate 90 arranged in the tag stacker 230 is a substrate 90 having a first surface 91 provided with a second element 60 and having a second surface 92 provided with an RF chip 10 and a coupling transformer 20.

That is, the substrate 90 with which the tag stacker 230 is filled does not include the first element 50 in the above-described RFID tag 100. The method for manufacturing the rubber-coated RFID tag 150 herein described is used, to manufacture the rubber-coated RFID tag 150 also including the first element 50.

As a method for providing the substrate 90 with the second element 60 and the coupling transformer 20, an existing method such as etching can be used. As a method for providing the substrate 90 with the RF chip 10, an existing method such as wire bonding can be used.

A second rubber roll 240 in FIG. 12 is a roll for feeding the vulcanized rubber sheet 130 onto the substrate 90 arranged on the first rubber sheet 120, and an idler 250 and an idler 260 are idlers that pressure-bond a laminate obtained by laminating the first rubber sheet 120, the substrate 90, and the vulcanized rubber sheet 130.

When the laminate obtained by laminating the first rubber sheet 120, the substrate 90, and the vulcanized rubber sheet 130 in this order is pressure-bonded by the idler 250 and the idler 260, a part of the butyl rubber sheet 120 as the first rubber sheet 120 enters the concave groove 65, and the braided wire arranged in the concave groove 65 is reliably held in the concave groove 65.

Respective parts of the butyl rubber sheet 120 and the second rubber sheet 130 extend outside the periphery of the substrate 90. Accordingly, the respective peripheries of the butyl rubber sheet 120 and the second rubber sheet 130 contact each other and are bonded to each other by pressurization.

Therefore, the substrate 90, elements (the RF chip 10, the coupling transformer 20, and the second element 60) provided on the first surface 91 and the second surface 92 of the substrate 90 and the first element 50 (the braided wire 205) remain protected by the butyl rubber sheet 120 and the second rubber sheet 130.

In FIG. 12, a cutter 270 and a cutter 280 cut the laminate including the first rubber sheet 120, the braided wire 205, and the vulcanized rubber sheet 130 at a set position into set dimensions.

The rubber-coated RFID tag 150 according to the present invention can be manufactured in the following manner using the above-described manufacturing apparatus.

The braided wire 205 delivered from the braided wire roll 200 is overlaid on the first rubber sheet 120 delivered from the butyl rubber roll 210, the substrate 90 is arranged at a determined position of the first rubber sheet 120 and the braided wire 205 by the tag stacker 230, and the braided wire 205 is arranged in the groove 65 in the substrate 90. In this time, the braided wire is press-fitted into the groove 65 by the substrate 90 pressurized toward the idler 220.

Then, the second rubber sheet 130 delivered from the second rubber roll 240 is arranged on the substrate 90 that has adhered on the first rubber sheet 120.

Then, the laminate obtained by laminating the first rubber sheet 120, the substrate 90, and the second rubber sheet 130 is pressure-bonded by being passed between the idler 250 and the idler 260.

Then, the pressure-bonded laminate is cut to predetermined dimensions.

(Another Method for Manufacture Rubber-Coated RFID Tag)

Although the substrate 90 fed from the tag stacker 230 is fed onto the butyl rubber sheet 120 in the manufacturing method illustrated in FIG. 12, the substrate 90 may be fed onto the butyl rubber sheet 120 in the following method.

Figure 13:
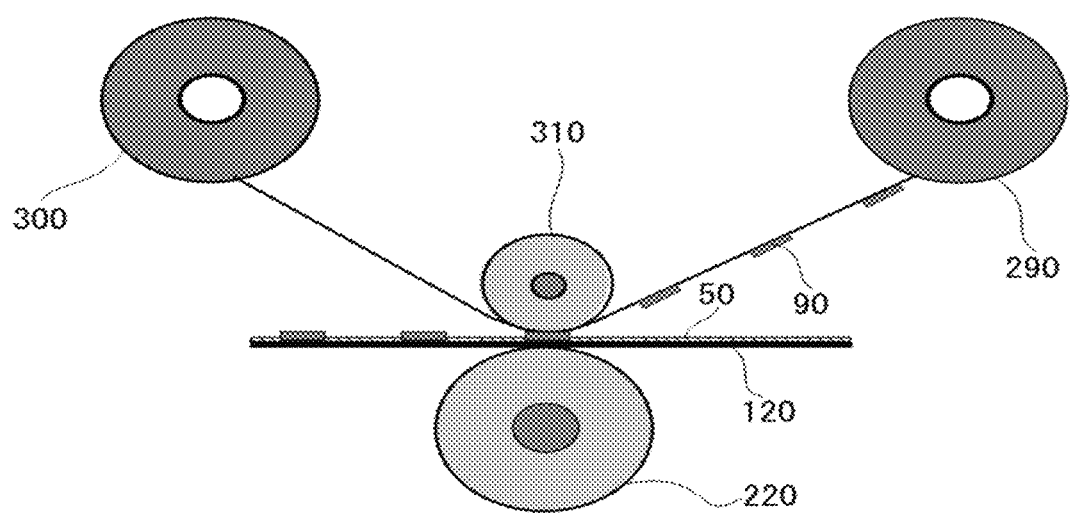
FIG. 13 is a schematic view illustrating a part of a manufacturing line when the rubber-coated RFID tag is manufactured using an RFID tag that remains taped.

A manufacturing apparatus illustrated in FIG. 13, in which a plurality of substrates 90 are installed with a predetermined spacing on a base material having a tape shape that does not expand and contract to adhere to the base material, includes a tag feeding roll 290 around which the base material is wound, a first idler 220 and a second idler 310 arranged to oppose the first idler 220, and a wind-up roll 300.

The manufacturing apparatus is configured such that the base material on which the substrates 90 are installed with a predetermined spacing is delivered from the tag feeding roll 290 and is passed between the first idler 220 and the second idler 310 to transfer the substrate 90 onto a butyl rubber sheet 120.

In the manufacturing apparatus, a braided wire 205 on the first rubber sheet 120 is also fitted into a groove 65 in the substrate 90 and arranged in the groove 65.

Figure 8:
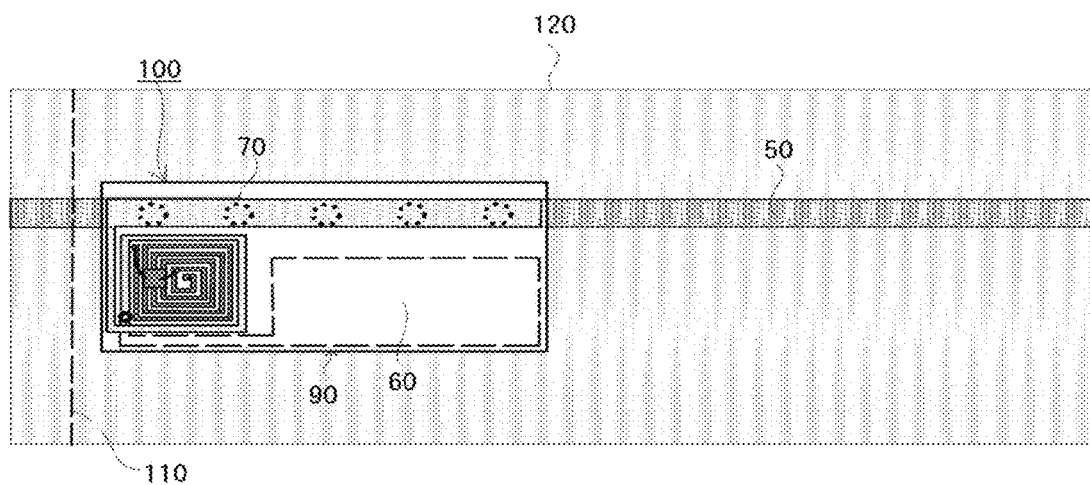
FIG. 8 is a schematic plan view illustrating the RFID tag that remains arranged to adhere to a butyl rubber sheet as viewed from the side of the second surface of the substrate.

Then, FIG. 8 is a plan view illustrating a state where an RFID tag 100 is arranged to adhere to the first rubber sheet 120 in a rubber-coated RFID tag 150 manufactured using the above-described manufacturing method. FIG. 9 is a cross-sectional view illustrating the rubber-coated RFID tag 150 in a state where the RFID tag 100 arranged to adhere on the first rubber sheet 120 illustrated in FIG. 8 is further coated with a second rubber sheet 130, followed by pressure-bonding, to sandwich the RFID tag 100 between the first rubber sheet 120 and the second rubber sheet 130.

FIG. 8 also illustrates a cut surface 110 along which the first rubber sheet 120, the braided wire 205 (a first element 50), and the second rubber sheet 130 (see FIG. 9) are cut at the time of manufacture.

The cut surface 110 is slightly spaced apart from an end portion of the substrate 90. As a result, an end portion of the first element 50 slightly protrudes from the end portion of the substrate 90. Accordingly, the entire substrate 90 is also reliably coated with the first rubber sheet 120 and the second rubber sheet 130 after the cutting, and can be prevented from being exposed. In the present embodiment, a distance between an end surface of the substrate 90 and the cut surface 110 is approximately 5 mm. A distance between the end surface of the substrate 90 and the cut surface 110 is preferably 5 mm or more.

Even when the tire 160 expands and contracts while an automobile is traveling, for example, by sandwiching the RFID tag 100 between the first rubber sheet 120 and the second rubber sheet 130, disposition of the first element 50 in the groove 65 and conductive connection to through holes 70 can be reliably performed, and a positional relationship between the first element 50 and the substrate 90 can be stabilized.

FIG. 11 is a schematic sectional view illustrating a state where the rubber-coated RFID tag 150 is affixed to the inside of the tire 160.

In FIG. 11, the tire 160 includes the wheel rim 161, the sidewall 166, and the tread 165, and the bead wire 162, the carcass 163, and the breaker cord 164 are embedded therein.

The rubber-coated RFID tag 150 is affixed to an inner surface of the tire 160 such that the first element 50 is along a radiation direction around a rotation axis of the tire. The rubber-coated RFID tag 150 is affixed to the inner surface of the tire 160 such that the first rubber sheet 120 side of the rubber-coated RFID tag 150 contacts the inner surface of the tire.

Therefore, the RFID tag 100 is affixed to the inner surface of the tire with adhesion of the butyl rubber sheet 120. Even when the butyl rubber sheet 120 contacts a bleeding component that bleeds from inside the tire, the butyl rubber sheet 120 is miscible with the bleeding component. Accordingly, the RFID tag 100 can be affixed to an inner peripheral surface of the tire in a long term.

A method for fixing he rubber-coated RFID tag 150 to the tire 160 is not limited to the foregoing, but can be affixed to or embedded in any portion of the tire 160.

For example, the rubber-coated RFID tag 150 may be affixed to an inner peripheral surface of a portion, where a tread pattern is arranged, of the tire, or may be affixed to an inner peripheral surface of a bead portion of the tire.

Figure 10:
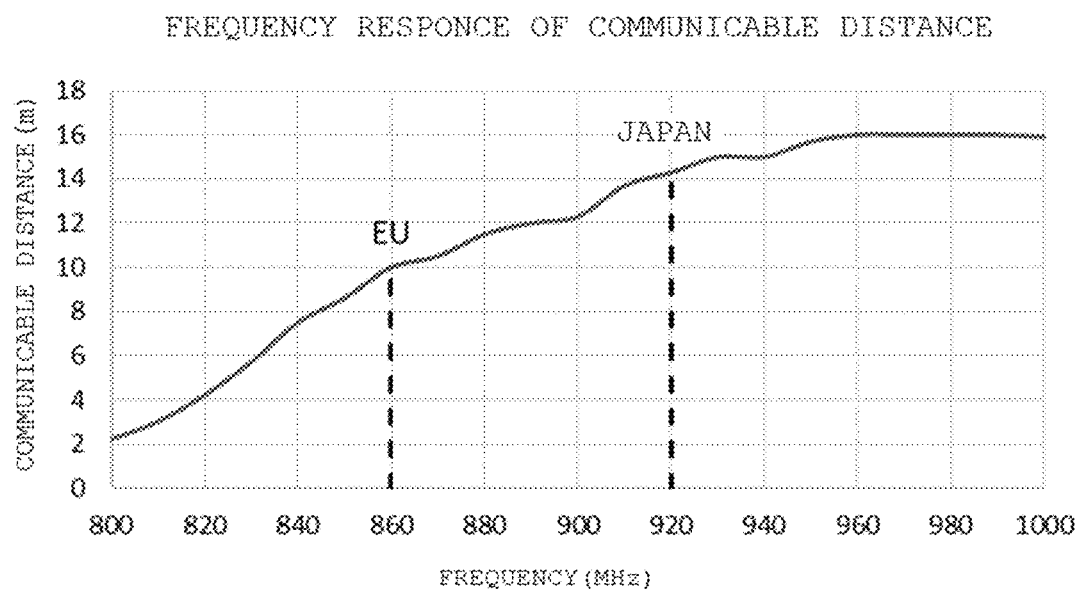
FIG. 10 is a diagram illustrating an example of a frequency characteristic of a communicable distance of the RFID tag that has been measured by affixing the rubber-coated RFID tag to the inside of a tire.

FIG. 10 is a diagram illustrating a frequency characteristic of a communicable distance of the RFID tag 100 that has been measured by affixing the rubber-coated RFID tag 150 to the inside of the tire 160.

In an RFID tag to be embedded in a tire 160, a path leading from an RF chip to an antenna may be made to have a sharp resonance characteristic to avoid a variation in frequency characteristic of the antenna by carbon black contained in the tire 160. However, the RFID tag generally differs in communication frequency between EU (a communication frequency of 860 MHz) and Japan (a communication frequency of 920 MHz). Accordingly, as the RFID tag in which the path leading from the RF chip to the antenna is made to have a sharp resonance characteristic, different RFID tags need to be respectively prepared for EU and for Japan.

On the other hand, in the rubber-coated RFID tag 150 according to the present invention, the coupling transformer 20 having different numbers of windings is provided between the RF chip 10 and the first element 50 and the second element 60, to reduce an impedance of the primary side 30 and exclude an influence of carbon black contained in tire rubber. This implements the RFID tag 100 enabling communication at a frequency in a wide range including EU and Japan, as illustrated in FIG. 10.

The rubber-coated RFID tag 150 according to the present invention has an advantage that a communication characteristic of the RFID tag 100 can be confirmed when the RFID tag 100 is affixed to the tire 160 or is embedded in the tire 160 by making measurements with the RFID tag 100 sandwiched between the first rubber sheet 120 and the second rubber sheet 130.

Second Embodiment

Figure 6:
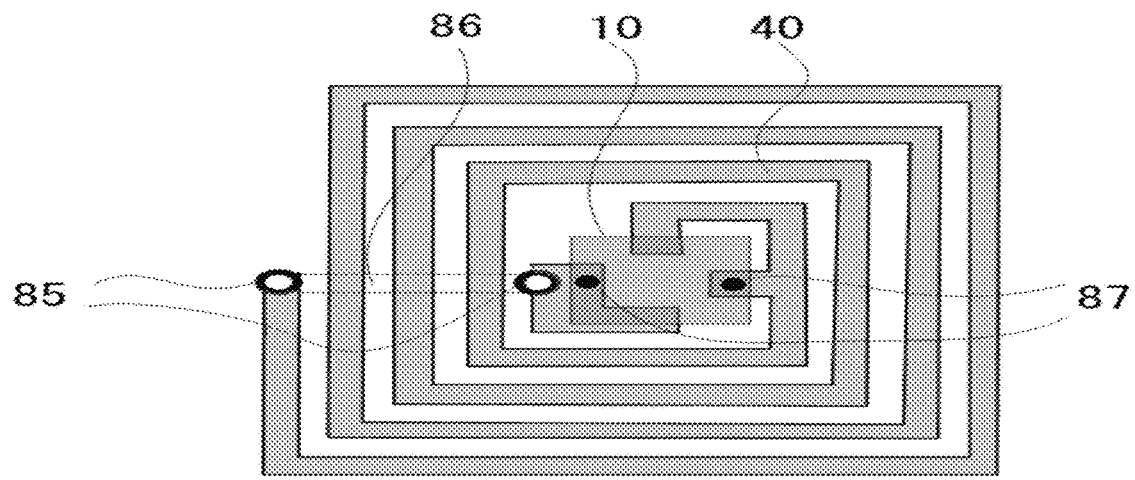
FIG. 6 is a schematic view illustrating connection between an RF chip and a secondary side of a coupling transformer when the RF chip is arranged at a first angle.
Figure 7:
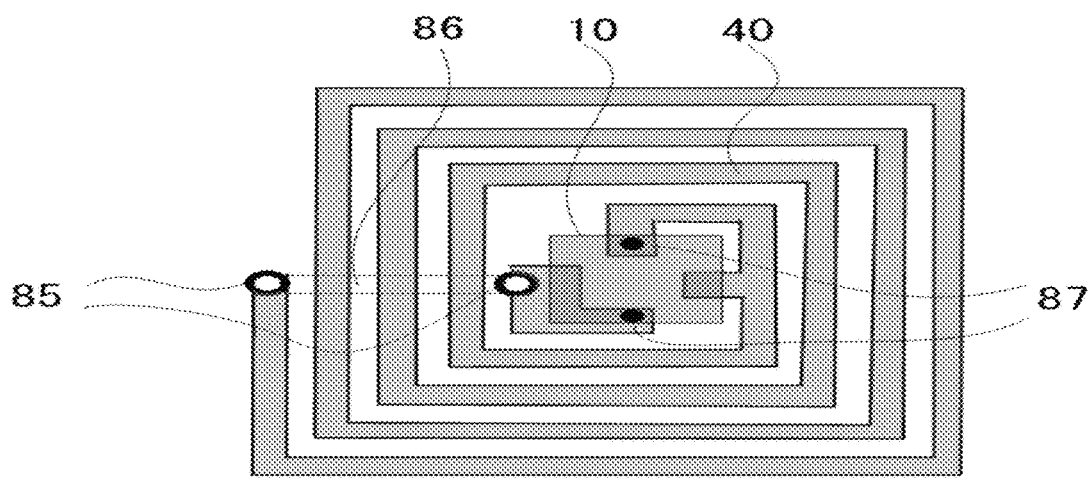
FIG. 7 is a schematic view illustrating connection between the RF chip and the secondary side of the coupling transformer when the RF chip is arranged at a second angle perpendicular to the first angle.

Then, FIGS. 6 and 7 respectively illustrate two examples of connection between a secondary side 40 of a coupling transformer 20 and an RF chip 10 in a second embodiment.

An RFID tag 100 according to the second embodiment is the same as that in the first embodiment except for only a method for mounting the RF chip 10 on a substrate 90 and a method for connection between the RF chip 10 and the secondary side 40 of the coupling transformer 20.

A so-called BGA package is used in the RF chip 10 according to the second embodiment. The RF chip 10 includes two bumps 87 as an electrical connection terminal (usually, further includes an additional bump 87 with no electrical connection as one for fixing the package). One end and the other end of the secondary side 40 of the coupling transformer 20 are respectively directly connected to the first bump 87 in the RF chip 10 and connected to the second bump 87 in the RF chip 10 via two through holes 85 and a wiring 86 on the side of a first surface 91.

A shape of the secondary side 40 of the coupling transformer 20 is the same between FIGS. 6 and 7. However, in the RF chip 10, the two bumps 87 are arranged in a horizontal direction and a vertical direction, respectively, in FIGS. 6 and 7. As a result, a number of wirings of the secondary side 40 illustrated in FIG. 7 is larger than a number of windings of the secondary side 40 illustrated in FIG. 6 by one-fourth thereof.

That is, when the RF chip 10 is the BGA package, the shape of the secondary side 40 of the coupling transformer 20 is the shape illustrated in FIG. 6 or 7, a winding number ratio of the coupling transformer 20 can be changed only by changing an arrangement angle of the same RF chip 10 using the same substrate 90. Therefore, in the RFID tag 100 according to the second embodiment, when an impedance of a primary side 30 of the coupling transformer 20 is desired to be changed depending on a rubber material for the tire 160 to be affixed or embedded, for example, the arrangement angle of the RF chip 10 is changed, whereby the impedance of the primary side 30 of the coupling transformer 20 can be changed for the RF chip 10 having the same input impedance.

Although a difference in the number of windings of the secondary side 40 of the coupling transformer 20 is onefourth thereof in the above-described example, it will be readily understood by those skilled in the art that the difference in the number of windings can be more increased by devising the shape of the secondary side 40 of the coupling transformer 20.

Figure 14:
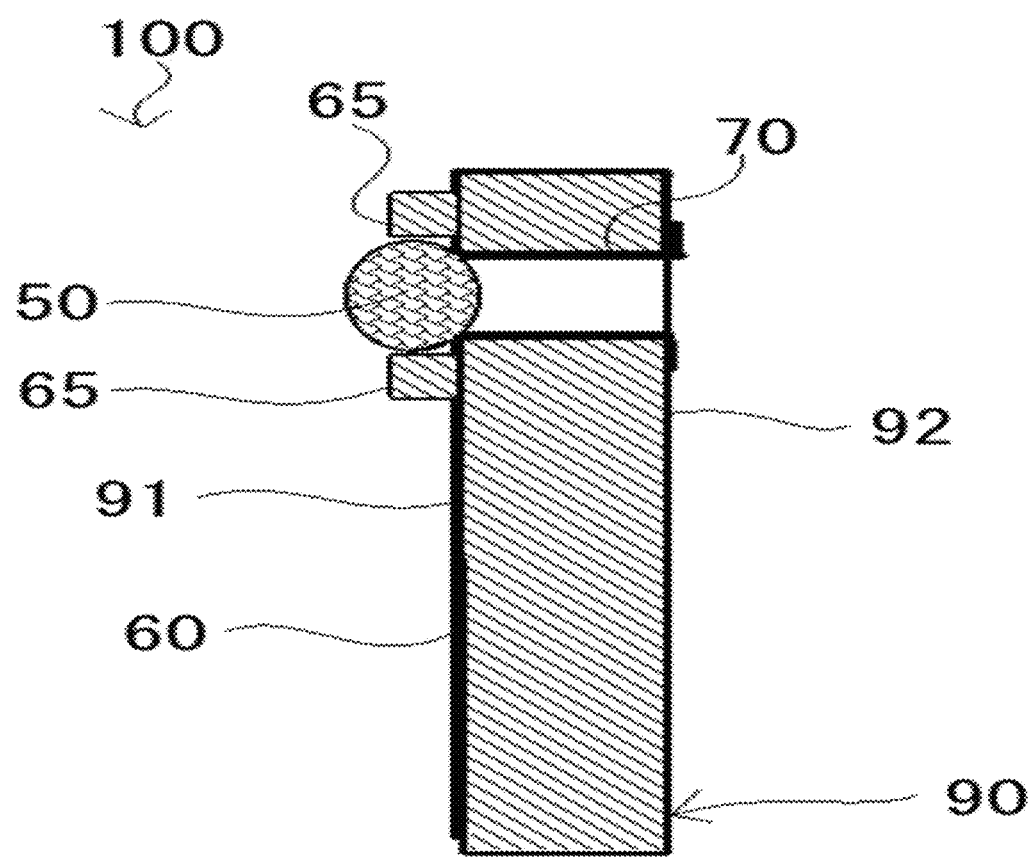
FIG. 14 is a schematic sectional view illustrating another example of FIG. 4.

Then, FIG. 14 is a schematic sectional view illustrating another example of FIG. 4. In an RFID tag 100 illustrated in FIG. 14, a projection (a guide section) 65 is formed around a through hole 70 and on a first surface 91 instead of the groove 65 illustrated in FIG. 4. As a result, a first element 50 can be arranged at a predetermined position.

The projection 65 may be partial or may be linearly formed.

Figure 15:
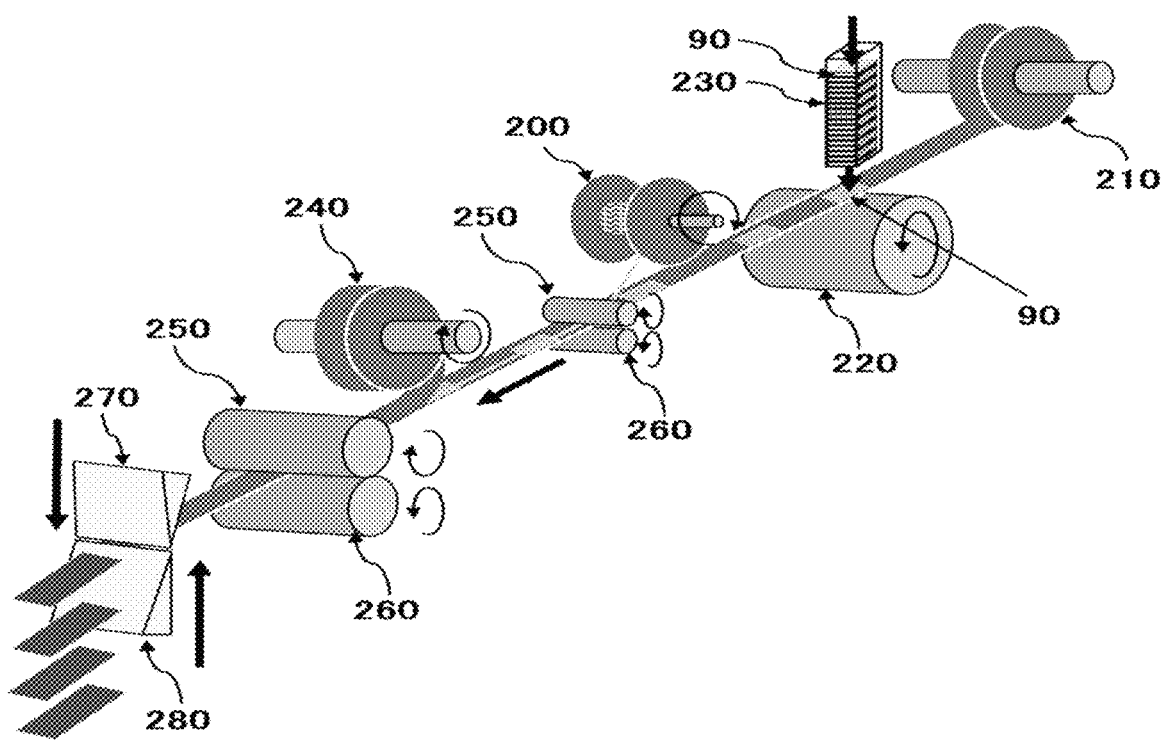
FIG. 15 is a schematic view illustrating another example of the manufacturing line of the rubber-coated RFID tag.

Then, FIG. 15 is a schematic view illustrating another example of a manufacturing line of a rubber-coated RFID tag 150.

The manufacturing line illustrated in FIG. 15 differs from the manufacturing line illustrated in FIG. 12 in that although the first element 50 is first placed on the first rubber sheet 120 and the butyl rubber sheet 120 in the manufacturing line illustrated in FIG. 12, a substrate 90 is arranged on an opposite surface to that illustrated in FIG. 12, i.e., such that a groove 65 is directed upward, and a first element 50 is then arranged in the groove 65 in the manufacturing line illustrated in FIG. 15.

Figure 16:
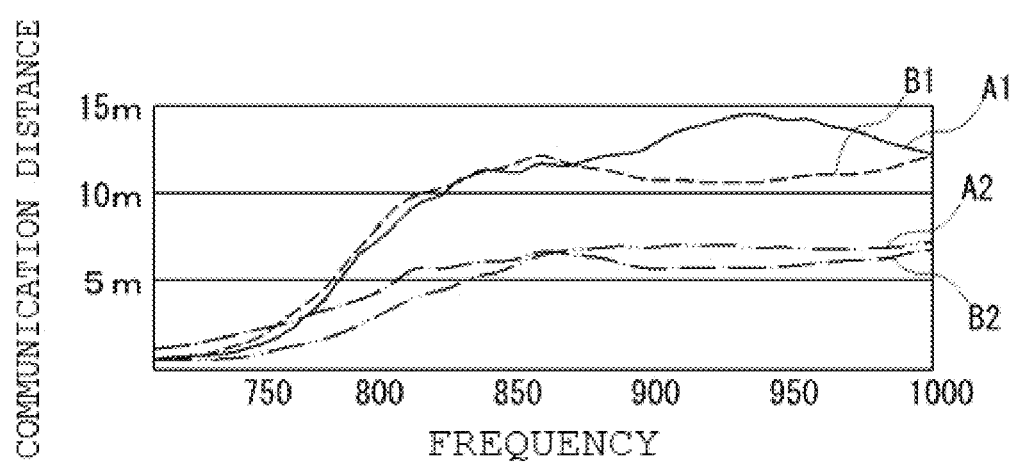
FIG. 16 is a schematic view illustrating a frequency and a communication distance when the RFID tag is attached to the tire.

Finally, FIG. 16 is a schematic view illustrating a frequency and a communication distance when an RFID tag 100 is attached to a tire 160.

As illustrated in FIG. 16, two types of tires 160 (A and B) were prepared. The frequency and the communication distance were measured in two types of cases, i.e., a case where a through hole 70 and the first element 50 in the RFID tag 100 are directly coupled to each other (A1, B1) and a case where they are capacitively coupled to each other (A2, B2).

Although the capacitive coupling is mainly direct bonding between a braided wire of the first element 50 and the through hole 70, there occurs a state where the first element 50 and the through hole 70 are coupled to each other with a capacitance interposed therebetween if the braided wire of the first element 50 and the through hole 70 are spaced a slight distance apart from each other in a manufacturing site. In this example, the state is set as capacitive coupling.

As illustrated in FIG. 16, when the tires 160 are of different types, it has been found that a difference slightly occurs as a result of comparing a graph A1 and a graph B1. Similarly, it has been found that a difference slightly occurs as a result of comparing a graph A2 and a graph B2.

When the graph A1 and the graph A2 illustrated in FIG. 16 are compared with each other, it has been found that the communication distance in the direct coupling is longer, but the graph A2 of the capacitive coupling is sufficient for practical use because it indicates the communication distance is 5 m or more at both 860 MHz and 920 MHz.

Similarly, when the graph B1 and the graph B2 illustrated in FIG. 16 are compared with each other, it has been found that the communication distance in the direct coupling is longer, but the graph B2 in the capacitive coupling is sufficient for practical use because it indicates that the communication distance is 5 m or more at both 860 MHz and 920 MHz.

Third Embodiment

The present embodiment is one of variants of the RFID tag described in Japanese Patent Application No. 2019-222421 in which a coil as a part of a coupling transformer is improved.

Figure 17:
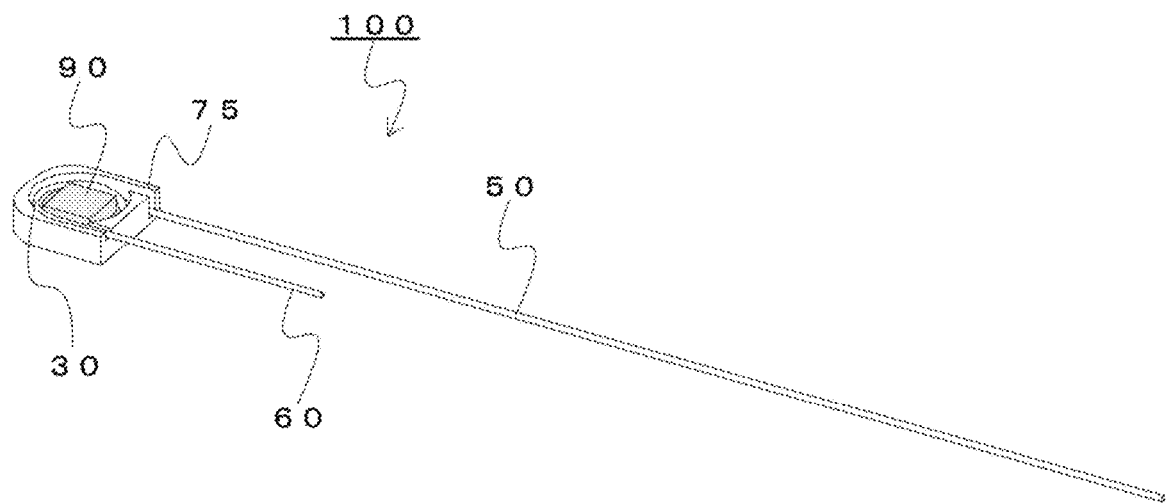
FIG. 17 is a schematic perspective view of an RFID tag including a coil according to a third embodiment.
Figure 18:
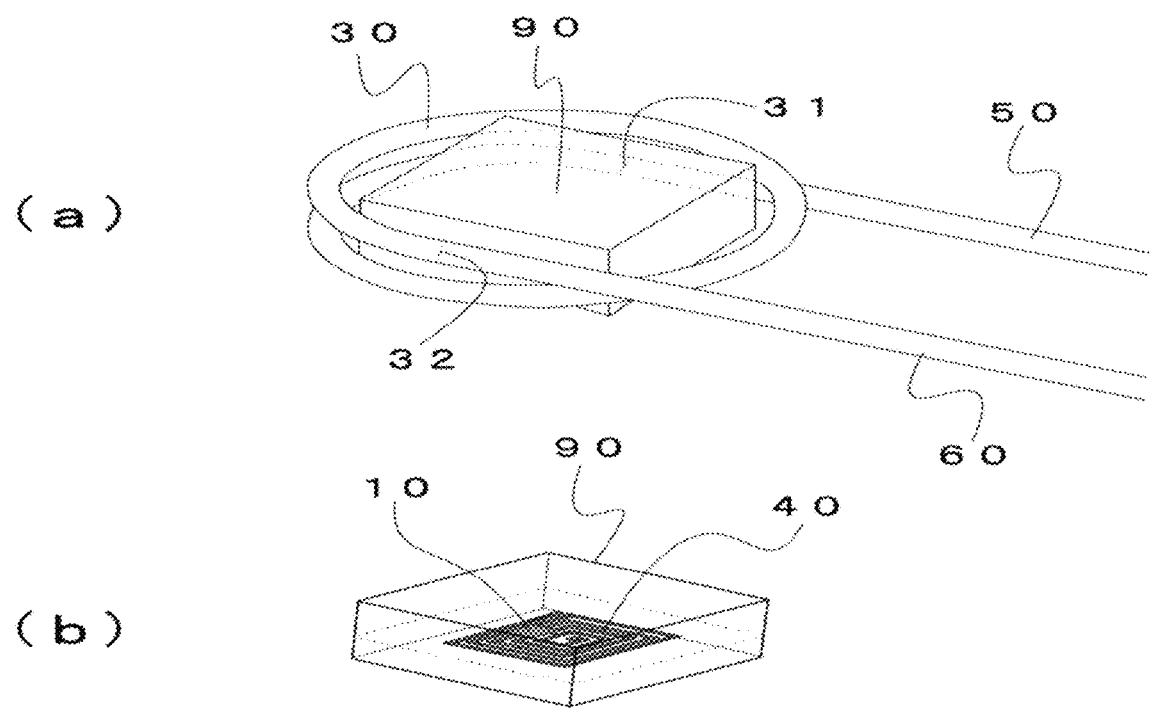
FIG. 18(a) is a schematic perspective view of a coil having a first element and a second element, respectively, in its end portions and a substrate according to the third embodiment.
FIG. 18(b) is a schematic perspective view of a pattern coil and an RF chip that are mounted on a substrate in an RFID tag including the coil according to the third embodiment.
Figure 19:
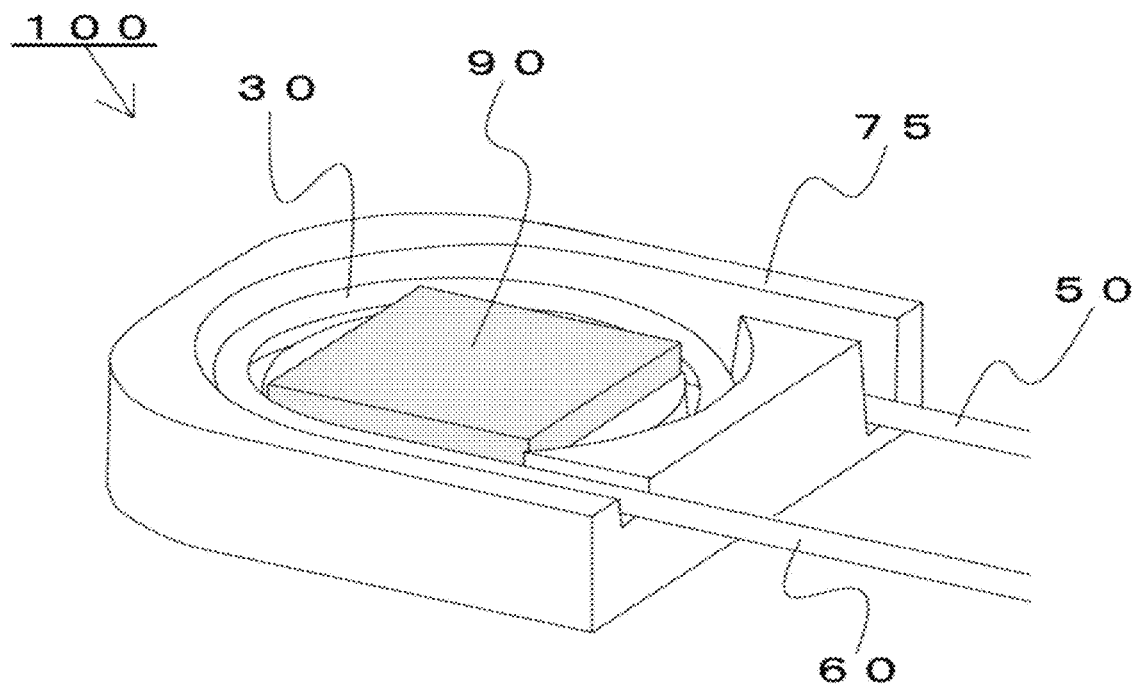
FIG. 19 is a schematic perspective view of a coil and a substrate that are housed in a housing in the RFID tag including the coil according to the third embodiment.
Figure 20:
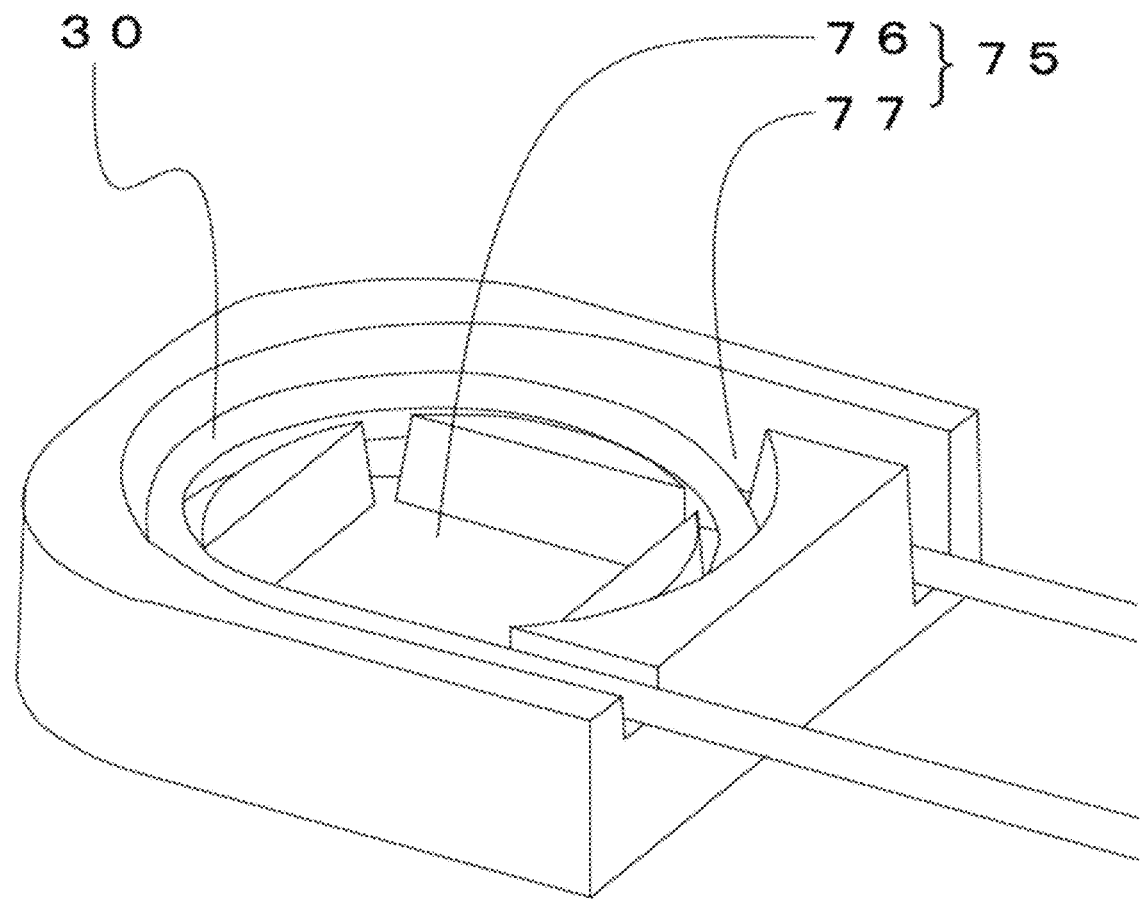
FIG. 20 is a schematic perspective view illustrating a storage section and a guide section in the housing in the RFID tag including the coil according to the third embodiment.

FIG. 17 is a schematic perspective view of an RFID tag 100 including a coil 30 according to a third embodiment, FIG. 18(a) is a schematic perspective view of a coil 30 having a first element and a second element, respectively, in its end portions and a substrate 90 in the third embodiment, and FIG. 18(b) is a schematic perspective view of a pattern coil 40 and an RF chip 10 that are mounted on the substrate 90 in the RFID tag 100 including the coil 30 according to the third embodiment. FIG. 19 is a schematic perspective view illustrating the coil 30 and the substrate 90 that are housed in a housing 75 in the RFID tag 100 including the coil 30 according to the third embodiment, and FIG. 20 is a schematic enlarged perspective view illustrating a storage section 76 and a guide section 77 in the housing 75 in the RFID tag 100 including the coil 30 according to the third embodiment.

In the RFID tag 100 according to the first embodiment, the primary side 30 of the coupling transformer 20 and the second element 60 are respectively formed on the surface of the substrate 90. On the other hand, in the RFID tag 100 including the coil 30 according to the third embodiment, a primary side of a coupling transformer is formed by the coil 30 held in the guide section 77 in the housing 75, and formed by winding a conducting wire around the substrate 90 in a top view. In the RFID tag 100 including the coil 30 according to the third embodiment, the one end of the coil 30 is extended to constitute the first element 50, the other end of the coil 30 is extended in the same direction as that of the first element 50 to constitute the second element 60, and an extension length of the first element 50 is made larger than an extension length of the second element 60. The first element and the second element are arranged substantially parallel to each other.

That is, the RFID tag 100 including the coil 30 according to the third embodiment is the RFID tag 100 including the substrate 90 having the RF chip 10 and the pattern coil 40 connected to the RF chip 10 mounted thereon, the coil 30 constituting the coupling transformer together with the pattern coil 40, and the housing 75 that houses the substrate 90 and the coil 30. A first end portion 31 of the coil 30 extends from the substrate 90 to constitute the first element 50 of an antenna, a second end portion 32 of the coil 30 extends in the same direction as that of the first element 50 to constitute the second element 60 of the antenna, the first element 50 has a larger extension length than that of the second element 60, and a number of windings of the coil 30 is smaller than a number of windings of the pattern coil 40.

The respective extension lengths of the first element 50 and the second element 60, and the number of windings of the coil 30 and the number of windings of the pattern coil 40 are preferably adjusted depending on a specification of an IC chip, a material for a tire, the content of carbon black, or the like.

The extension lengths of the first element and the second element are respectively set as lengths in linear portions of the first element 50 and the second element 60.

In the housing 75, the guide section 77 that fixes the coil 30 to hold the coil 30 and the storage section 76 that stores the substrate 90 are formed. By the housing 75, the substrate 90 and the coil 30 are fixed to each other such that an axis of the pattern coil 40 and an axis of the coil 30 match each other. That is, in the housing 75, a ring-shaped groove that guides the coil 30 is formed as the guide section 77, and a wall piece for holding the substrate 90 is provided. A center point of the axis of the pattern coil 40 and a center point of the axis of the coil 30 also preferably match each other in an axial direction.

The substrate 90 in the present embodiment may be mounted such that the RF chip 10 and the pattern coil 40 are arranged on the surface of the substrate 90, like a printed circuit board, or may be mounted such that the RF chip 10 and the pattern coil 40 are embedded in the substrate 90, as illustrated in FIG. 18(b). In this case, the substrate 90 is configured by laminating a plurality of resin layers, and the RF chip 10 and the pattern coil 40 are embedded between the adjacent resin layers.

The pattern coil 40 in the present embodiment may operate as a coil constituting the coupling transformer, and is not limited to a planar coil formed by vapor deposition or the like, but may be a coil of a conducting wire.

The first element 50, the primary side 30 of the coupling transformer 20, and the second element 60 in the RFID tag 100 including the coil 30 according to the third embodiment are formed to bend one conducting wire, as illustrated in FIG. 18(a), and the coil 30 is wound around an outer peripheral portion of the substrate 90 illustrated in FIG. 18(b).

As illustrated in FIG. 18(b), the RF chip 10 is mounted on the substrate 90 on the top of the pattern coil 40, and one of two output terminals of the RF chip 10 and the other output terminal are respectively connected to one end and the other end of the pattern coil 40.

As illustrated in FIG. 19, the substrate 90 having the RF chip 10 and the pattern coil 40 mounted thereon and the coil 30 are fixed to the housing 75. The substrate 90 and the coil 30 are housed in the housing 75. The substrate 90 and the coil 30 are sealed into the housing 75 by molding (potting) of resin or the like (not illustrated). The first element 50 and the second element 60, which are extended from the coil 30, protrude parallel to each other from the sealed housing 75.

As illustrated in FIG. 20, the guide section 77 is formed in the housing 75, and the guide section 77 functions to hold a shape of the conducting wire of the coil 30.

In the RFID tag 100 including the coil 30 according to the third embodiment, when the number of windings of the coil 30 is made smaller than the number of windings of the pattern coil 40, an input of the coil 30 to which the first element 50 and the second element 60 are connected is also set to a low impedance, and an output of the pattern coil 40 can also be converted into a high impedance and matched to an input impedance of the RF chip 10, like in the RFID tag 100 according to the first embodiment.

In the RFID tag 100 including the coil 30 according to the third embodiment, when the RFID tag 100 is attached to a rubber product such as a tire, not only the first element 50 but also the second element 60 is embedded in or affixed to the rubber product such as the tire having a resistive impedance and is electrically connected thereto. Accordingly, the rubber product such as the tire connected to the second element 60 functions as a ground of the RFID tag 100, whereby communication can be performed with high sensitivity. Therefore, the RFID tag 100 can be one excellent in communication characteristic when attached to the rubber product such as the tire.

Further, in the RFID tag 100 including the coil 30 according to the third embodiment, the coil 30 and the first element 50 and the second element 60 are formed by bending one conducting wire, thereby eliminating the need for connection such as soldering, resulting in a simple manufacturing process and a high reliability in electrical connection.

The RFID tag 100 including the coil 30 according to the third embodiment can also be embedded in the rubber product as it is when attached to the rubber product such as the tire. However, it is preferable that a resin-molded RFID tag 155 in which the housing 75 is molded with resin 93 is embedded in the rubber product in terms of being able to prevent the coil 30 and the substrate 90 from shifting in position, for example, at the time of embedding. The RF chip 10 can be molded with the resin 93. Accordingly, the RF chip 10 can be mounted on the pattern coil 40 in a bare chip state where it has not been packaged.

As the mold resin, normal thermosetting epoxy resin can be used. The mold resin is preferably given functionalities such as a heat dissipation property and a thermal expansion coefficient by being mixed with fine particles of silica ($SiO_2$, silicon dioxide).

Figure 21:
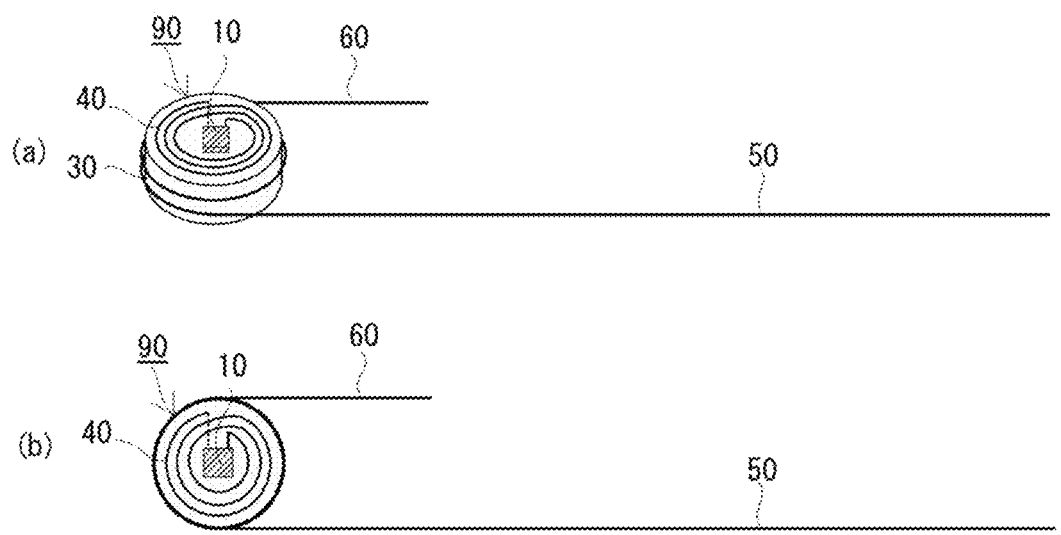
FIG. 21(a) is a schematic perspective view of an RFID tag including a coil according to a first modification.
FIG. 21(b) is a schematic top view of the RFID tag including the coil according to the first modification.
Figure 22:
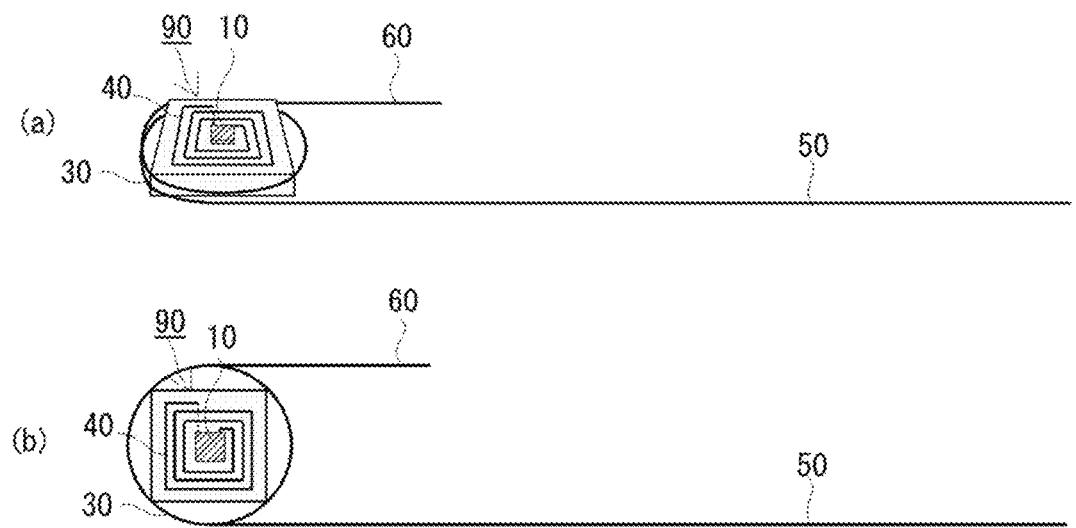
FIG. 22 is a schematic perspective view of an RFID tag including a coil according to a second modification.

FIG. 21 illustrates a first modification of the RFID tag 100 including the coil 30 according to the third embodiment, and FIG. 22 illustrates a second modification of the RFID tag 100 including the coil 30 according to the third embodiment.

FIG. 21(a) is a schematic perspective view of the RFID tag 100 including the coil 30 according to the first modification, and FIG. 21(b) is a schematic top view of the RFID tag 100 including the coil 30 according to the first modification. FIG. 22(a) is a schematic perspective view of the RFID tag 100 including the coil 30 according to the second modification, and FIG. 22(b) is a schematic top view of the RFID tag 100 including the coil 30 according to the second modification.

In the RFID tag 100 including the coil 30 according to the third embodiment illustrated in FIGS. 17 to 20, the coil 30 wound in a ring shape is wound around the outer peripheral portion of the substrate 90 having a square shape. On the other hand, in the RFID tag 100 including the coil 30 according to the first modification illustrated in FIG. 21, the coil 30 wound in a ring shape is wound around an outer peripheral portion of a substrate 90 having a columnar shape. In the RFID tag 100 including the coil 30 according to the second modification illustrated in FIG. 22, the coil 30 wound in a ring shape is wound around the substrate 90 having a square shape to contact a corner portion of the substrate 90.

In the present invention, the RF chip 10 corresponds to an "RF chip", the coupling transformer 20 corresponds to a "coupling transformer", the first element 50 corresponds to a "first element", the second element 60 corresponds to a "second element", the substrate 90 corresponds to a "substrate, the coil 30 and the primary side 30 correspond to a "coil", the pattern coil 40 and the secondary side 40 correspond to a "pattern coil, the housing 75 corresponds to a "housing", the storage section 76 corresponds to a "storage section", the groove 65 and the guide section 77 correspond to a "guide section", and the RFID tag 100 and the resin-molded RFID tag 155 correspond to an "RFID tag".

Although the preferred embodiments of the present invention are as described above, the present invention is not limited to that. It will be understood that various embodiments are implemented without departing from the spirit and scope of the present invention. Further, although functions and effects based on a configuration of the present invention have been described in the present embodiments, the functions and the effects are merely examples, and are not intended to limit the present invention.

REFERENCE SIGNS LIST

10 RF chip
20 coupling transformer
30 coil
40 pattern coil
50 first element
60 second element
75 housing
76 storage section
77 guide section
90 substrate
100 RFID tag
160 tire
500 RFID tag-incorporated tire

What is claimed is:

1. A coil for RFID tag used in an RFID tag including an RF chip and a substrate having a pattern coil connected to the RF chip mounted thereon, wherein
    the RFID tag is used in tires,
    the coil is held in a ring-shaped groove in a housing that houses the substrate and is wound around the substrate,
    a first end portion of the coil protrudes from the housing to constitute a first element of an antenna,
    a second end portion of the coil protrudes from the housing to constitute a second element of the antenna,
    the first element and the second element are arranged parallel to each other, and the first element has a larger extension length than that of the second element, and
    the coil and the pattern coil constitute a coupling transformer, and a number of windings of the coil is smaller than a number of windings of the pattern coil.

2. The coil for RFID tag according to claim 1, wherein the coil and the first element and the second element in the respective end portions of the coil are formed by bending one conducting wire.

3. The coil for RFID tag according to claim 1, wherein
    the housing includes a guide section that holds a shape of the coil and a storage section that stores the substrate, and
    an axis of the pattern coil and an axis of the coil match each other.

4. The coil for RFID tag according to claim 1, wherein letting λ be a wavelength of a radio wave at a communication frequency of the RFID tag, an electrical length of the first element is λ/4, λ/2, (3/4)λ, or (5/8)λ.

5. The coil for RFID tag according to claim 1, wherein the coil and the substrate are molded into the housing with resin.

6. The coil for the RFID tag according to claim 1, wherein
   the first end portion of the coil protrudes from a first groove portion connected to the groove of the housing,
   the second end portion of the coil protrudes from a second groove portion connected to the groove of the housing, and
   the first groove portion has a deeper groove depth than the second groove portion.

7. The coil for the RFID tag according to claim 1, wherein the coil is wound in the ring-shaped groove one or more times.

\* \* \* \* \*